(12) United States Patent
Bert

(10) Patent No.: US 12,543,890 B2
(45) Date of Patent: Feb. 10, 2026

(54) PIZZA OVEN INCLUDING ROTATING BAKING STONE

(71) Applicant: Napoli LLC, Woodbury, MN (US)

(72) Inventor: Eric Thomas Bert, Woodbury, MN (US)

(73) Assignee: Napoli LLC, Woodbury, MN (US)

( * ) Notice: Subject to any disclaimer, the term of this patent is extended or adjusted under 35 U.S.C. 154(b) by 746 days.

(21) Appl. No.: 17/456,181

(22) Filed: Nov. 23, 2021

(65) Prior Publication Data

US 2022/0192421 A1 Jun. 23, 2022

Related U.S. Application Data

(60) Provisional application No. 63/199,383, filed on Dec. 22, 2020.

(51) Int. Cl.
| | |
|---|---|
| A47J 37/06 | (2006.01) |
| A23L 5/10 | (2016.01) |
| F23Q 13/02 | (2006.01) |
| F24B 13/02 | (2006.01) |
| F24B 15/00 | (2006.01) |

(52) U.S. Cl.
CPC .............. *A47J 37/0658* (2013.01); *A23L 5/17* (2016.08); *A47J 37/0647* (2013.01); *A47J 37/0664* (2013.01); *F23Q 13/02* (2013.01); *F24B 13/02* (2013.01); *F24B 15/005* (2013.01); *A23V 2002/00* (2013.01)

(58) Field of Classification Search
CPC ........................................................ F24C 1/04
USPC ........................................................ 126/19 R
See application file for complete search history.

(56) References Cited

U.S. PATENT DOCUMENTS

| | | | | |
|---|---|---|---|---|
| 5,213,075 | A | * | 5/1993 | Stephen .................. F23Q 13/02 |
| | | | | 126/41 R |
| 5,878,739 | A | * | 3/1999 | Guidry ................ A47J 37/0713 |
| | | | | 126/41 R |
| 2015/0027432 | A1 | * | 1/2015 | Contarino, Jr. ..... A47J 37/0763 |
| | | | | 126/25 R |
| 2018/0213973 | A1 | | 8/2018 | Tapaninaho |
| 2019/0049117 | A1 | | 2/2019 | Tapaninaho |

(Continued)

FOREIGN PATENT DOCUMENTS

GB 2528854 A 2/2014

OTHER PUBLICATIONS

U.S. Appl. No. 62/608,185, filed Dec. 20, 2017.

(Continued)

*Primary Examiner* — Steven B Mcallister
*Assistant Examiner* — John E Bargero
(74) *Attorney, Agent, or Firm* — Merchant & Gould P.C.

(57) ABSTRACT

An example oven can include: a main body defining a cooking cavity; a front portion of the main body defining a front opening for receiving a food item and acting as an air vent; a baking stone positioned to support the food item; a tray assembly including a grate positioned in the main body; and a gas burner positioned adjacent to the baking stone and the tray assembly; wherein the gas burner is configured to combust a gas to heat the cooking cavity; wherein the gas burner is positioned to ignite fuel on the grate of the tray assembly to further heat the cooking cavity; and wherein the gas burner is positioned to heat at least a portion of the baking stone.

18 Claims, 34 Drawing Sheets

(56) References Cited

U.S. PATENT DOCUMENTS

2019/0231123 A1* 8/2019 Borovicka .......... A47J 37/0718
2020/0345176 A1 11/2020 Bert
2023/0106404 A1* 4/2023 Gozney ................ A47J 36/32
99/340

OTHER PUBLICATIONS

Kickstarter, Napoli Multi-Fueled Outdoor Pizza Oven, Nov. 7, 2017, 33 pages.
Gozney, Roccbox Portable Wood and Gas Pizza Oven, copyright 2019.
Big Horn Outdoors, "Big Horn Outdoors Gas Pizza Oven", https://www.amazon.com/dp/B095SD88CS, Nov. 14, 2021, 9 pages.
Onlyfire Outdoor LLC, "Mimiuo Portable Gas Pizza Oven", https://www.amazon.com/Mimiuo-Portable-Pizza-Stone-Foldable/dp/B08HCT5BR8, 2021, 11 pages.
Gozney, Gozney Dome, https://us.gozney.com/products/dome?switcher=true&variant=39308025135241, copyright 2025 Gozney US, 15 pages.
Gozney, Specification Sheet Gozney Dome, Version 1.2, https://cdn.accentuate.io/5226204627081/13495284007049/Dome-Spec-Sheet---UL---210526-v1622022348071.pdf, May 26, 2021, 2 pages.
Gozney, Technical Manual Gozney Dome, https://cdn.accentuate.io/5226204627081/13495284007049/DOC-0027 (02)(Dome-Technical-Document-US-LR)-v1644311483003.pdf, accessed Apr. 3, 2025, 72 pages.

* cited by examiner

PIZZA OVEN INCLUDING ROTATING BAKING STONE

RELATED APPLICATIONS

This patent application is related to U.S. patent application Ser. No. 16/556,274 filed on Aug. 30, 2019, the entirety of which is hereby incorporated by reference.

INTRODUCTION

The quest to cook the perfect Neapolitan style pizza with a light, crispy crust is a never-ending journey. Restaurants construct large, wood-filled brick ovens that are maintained at the high temperatures necessary to cook these pizzas. However, it is difficult and cost-prohibitive for individuals to create the proper cooking environment at home or on the go. This can result less-then-optimal conditions that cause the pizza to be over- or under-cooked.

SUMMARY

In one aspect, an example oven can include: a main body with a cooking cavity; a front portion of the main body having a front opening for receiving a pizza and acting as an air vent; a wood burning tray assembly including a grate positioned in the main body; and a gas burner positioned adjacent to the wood burning tray assembly; wherein the gas burner is configured to combust a gas to heat the cooking cavity; and wherein the gas burner is positioned to ignite wood on the grate of the wood burning tray assembly to further heat the cooking cavity.

In some configurations, the gas burner may be further positioned to also heat at least a portion of the baking stone.

Other configurations are possible.

DETAILED DESCRIPTION

Figure 1:
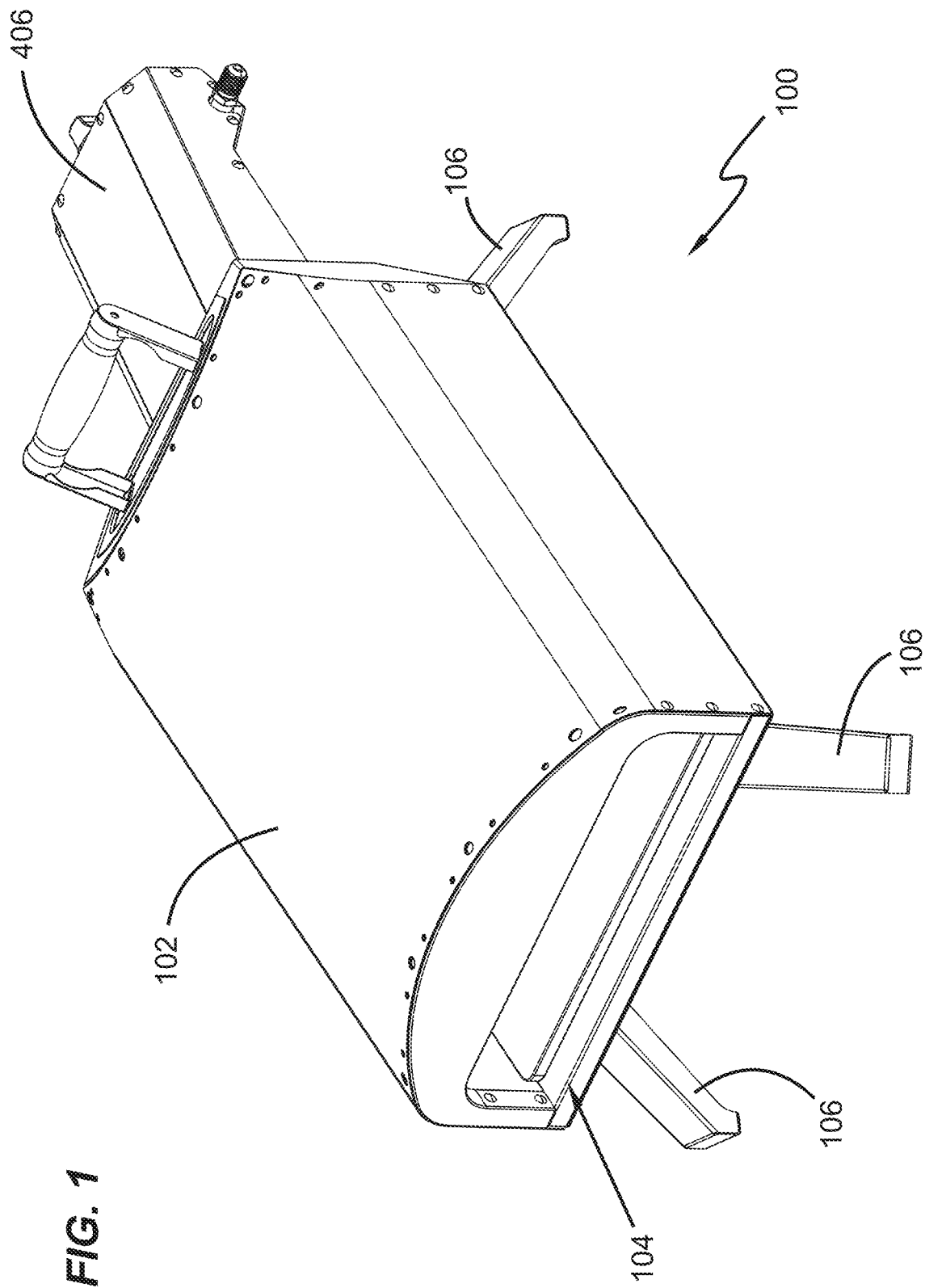
FIG. 1 shows an example oven configured to use multiple fuel sources.
Figure 2:
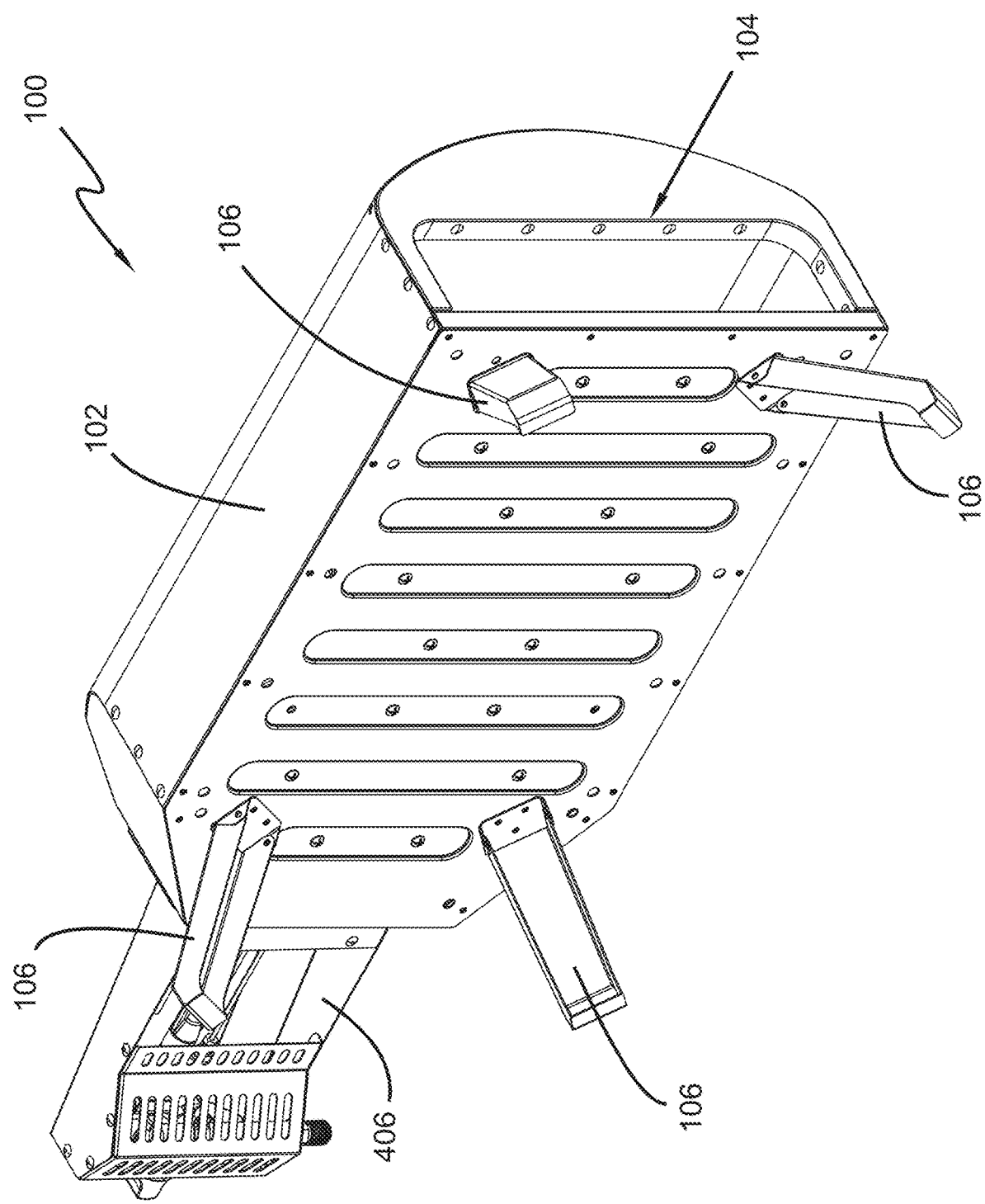
FIG. 2 shows additional aspects of the oven of FIG. 1.
Figure 3:
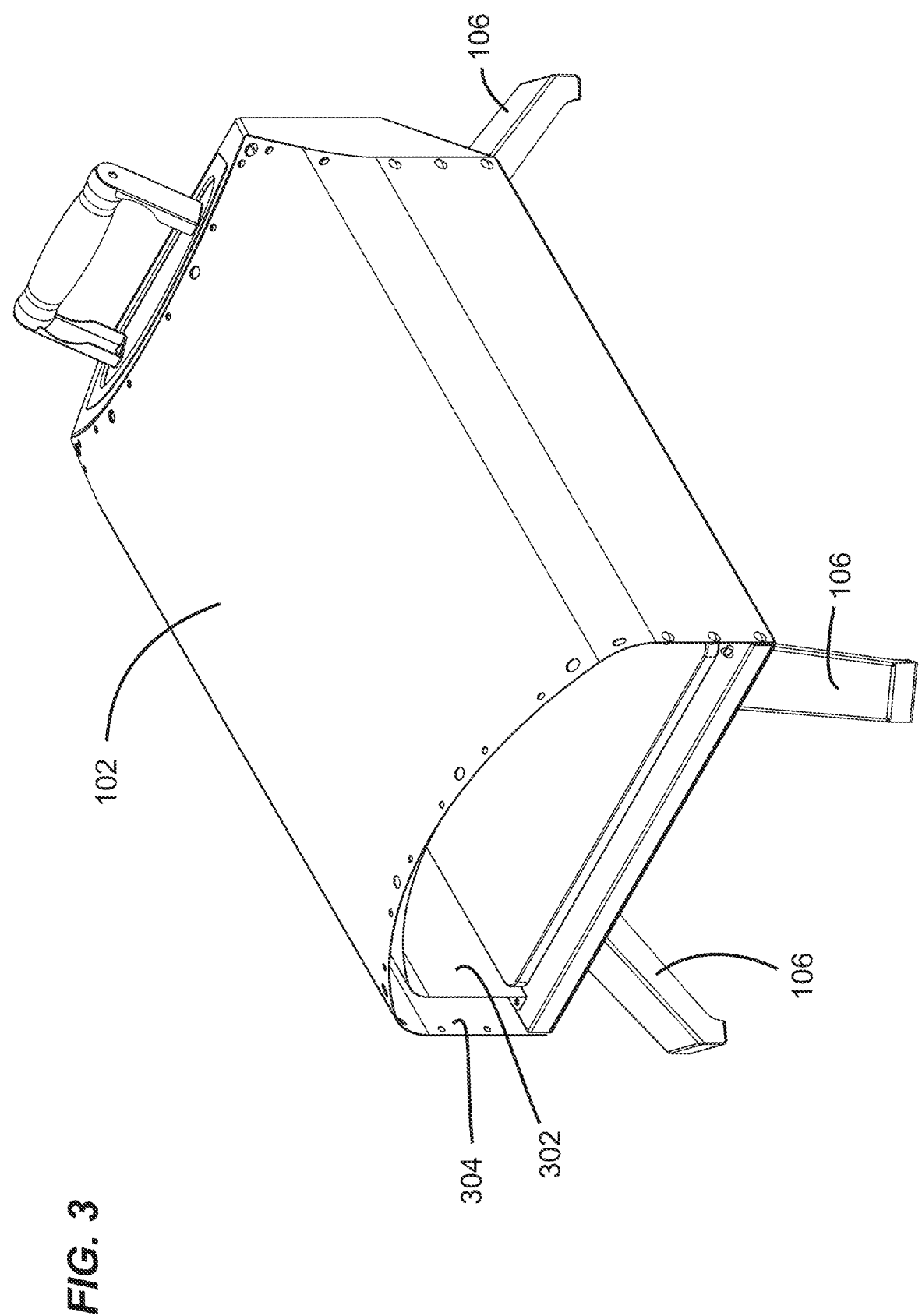
FIG. 3 shows additional aspects of the oven of FIG. 1.
Figure 4:
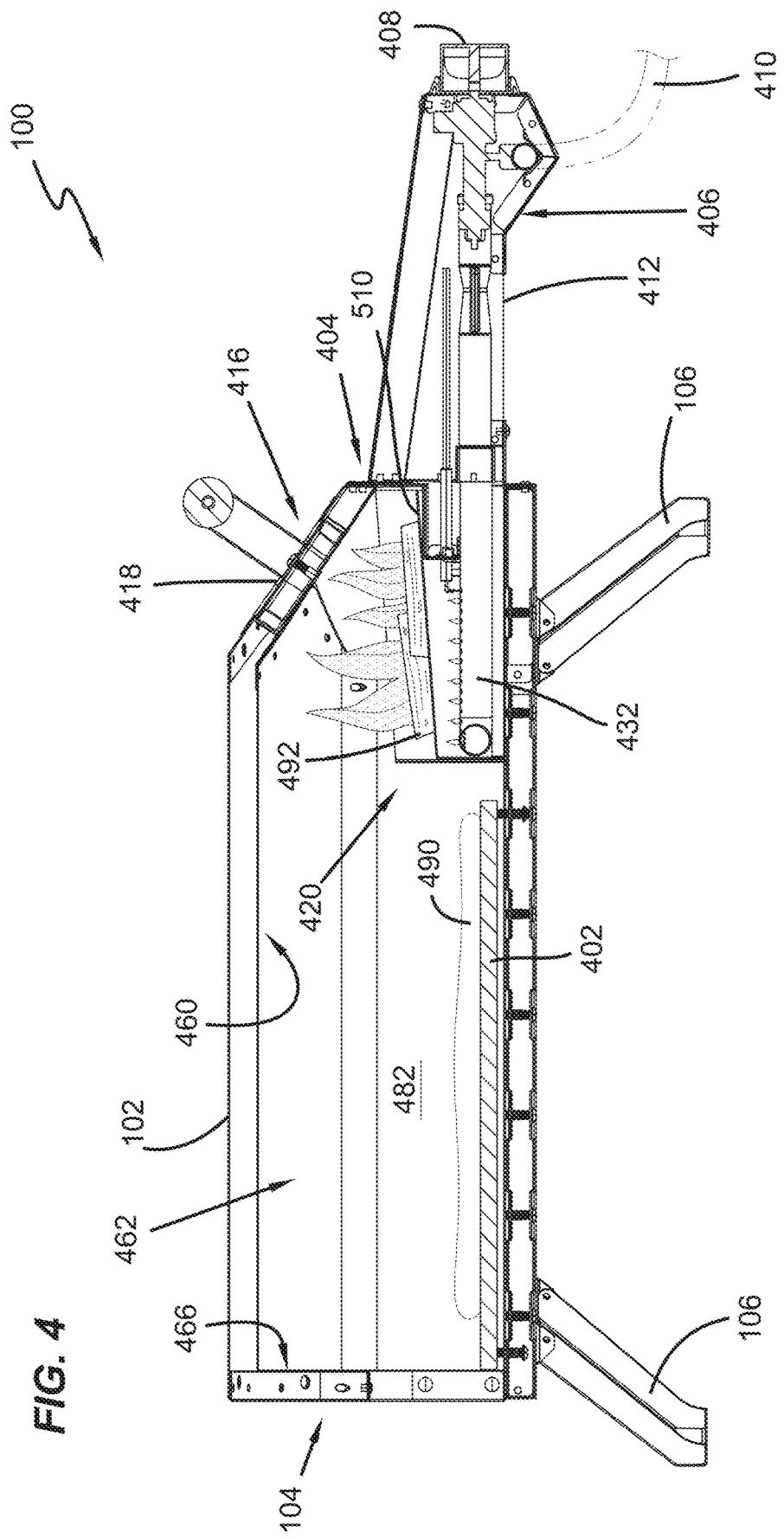
FIG. 4 shows a cross-sectional view of the oven of FIG. 1.
Figure 5:
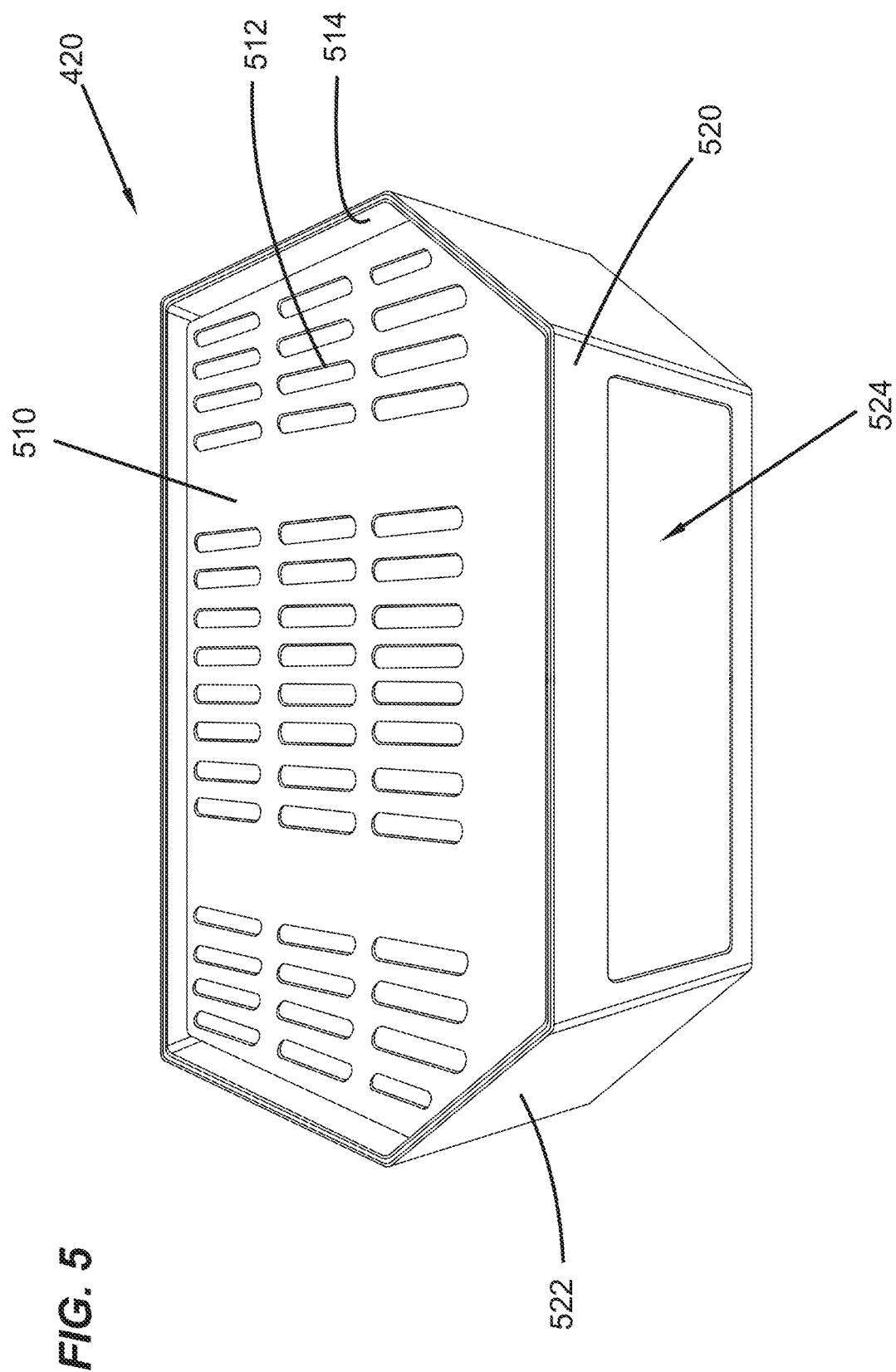
FIG. 5 shows an example wood burning tray assembly of the oven of FIG. 1.
Figure 6:
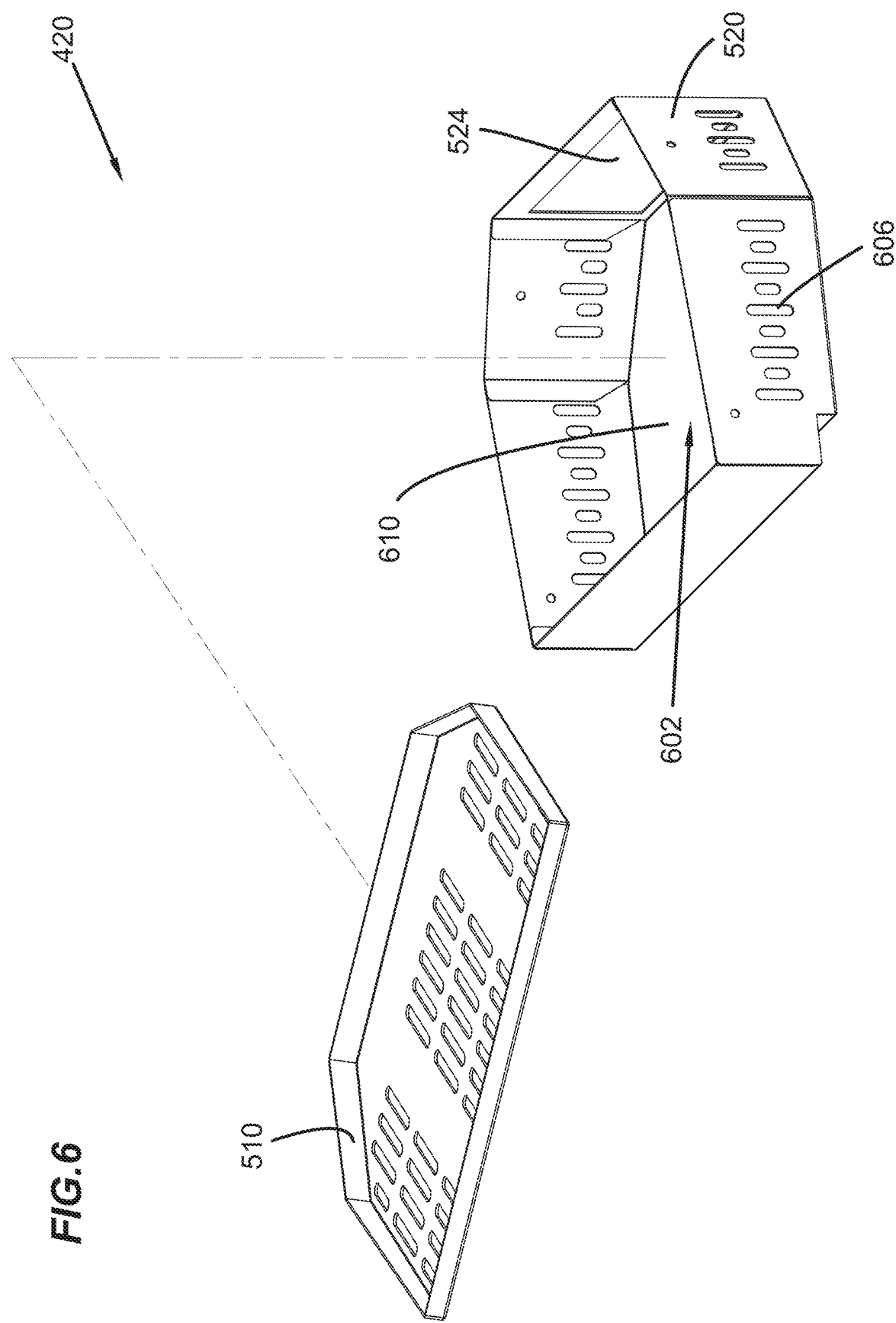
FIG. 6 shows additional aspects of the wood burning tray assembly of FIG. 5.
Figure 7:
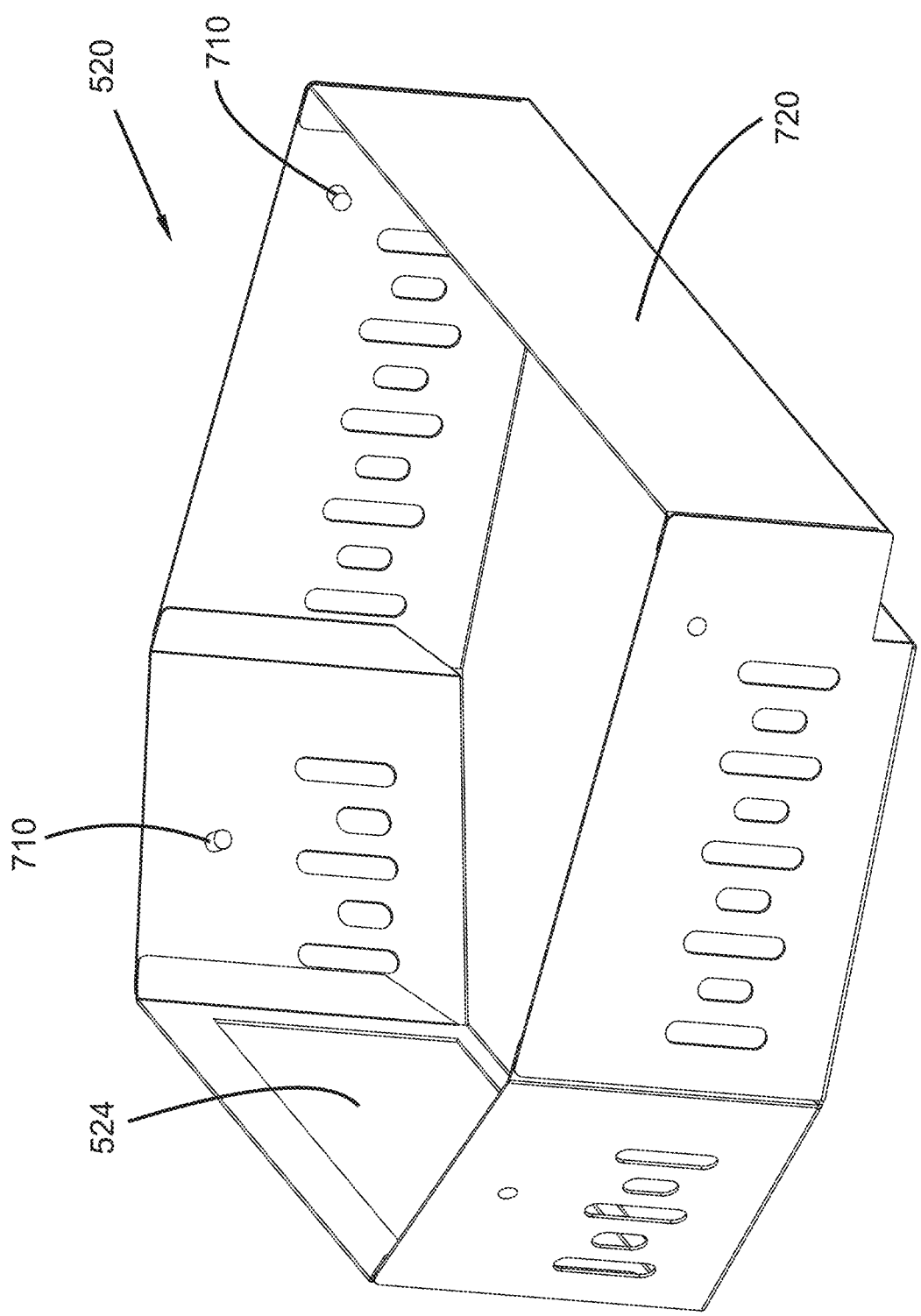
FIG. 7 shows additional aspects of the wood burning tray assembly of FIG. 5.
Figure 8:
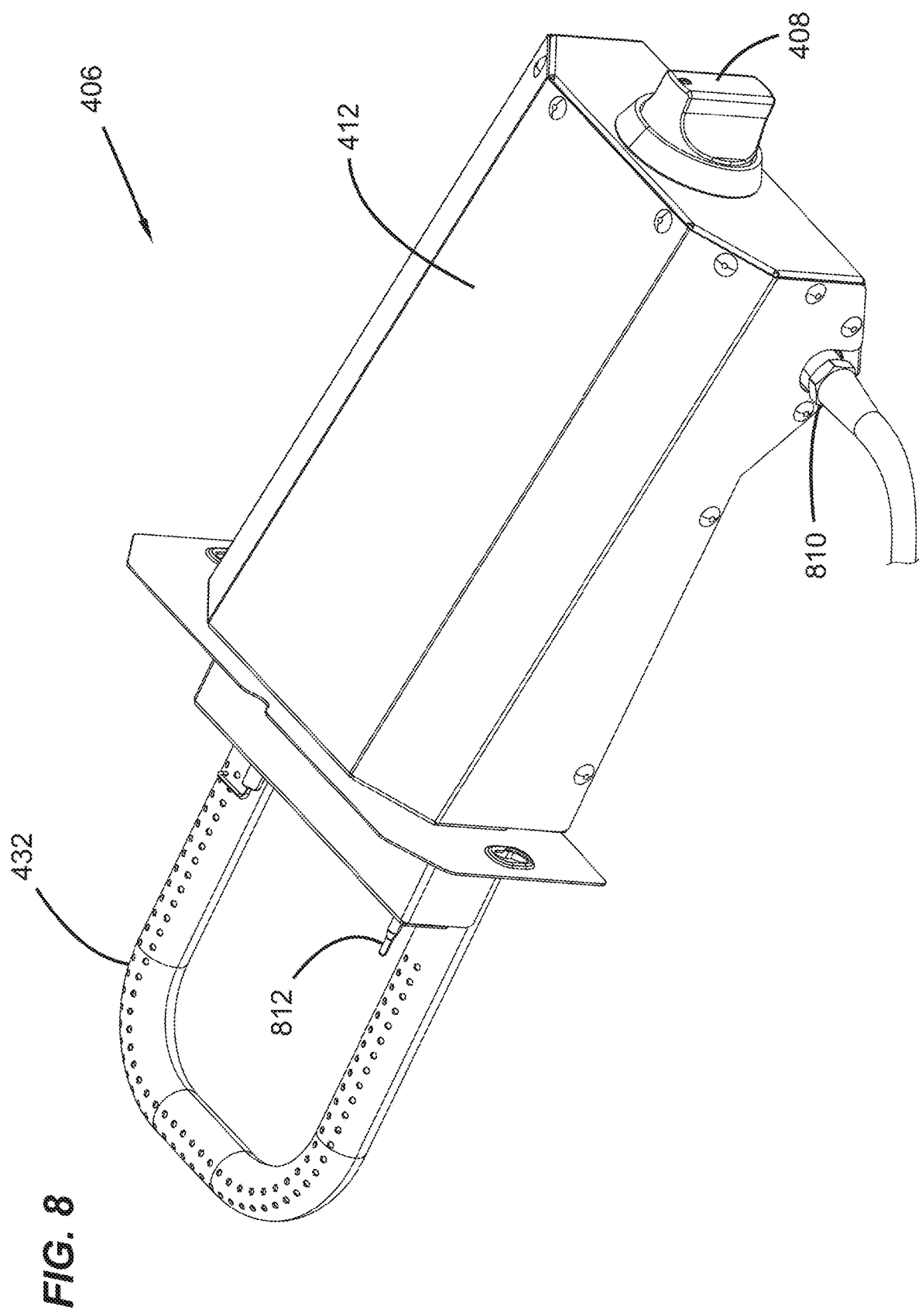
FIG. 8 shows an example gas burner of the oven of FIG. 1.
Figure 9:
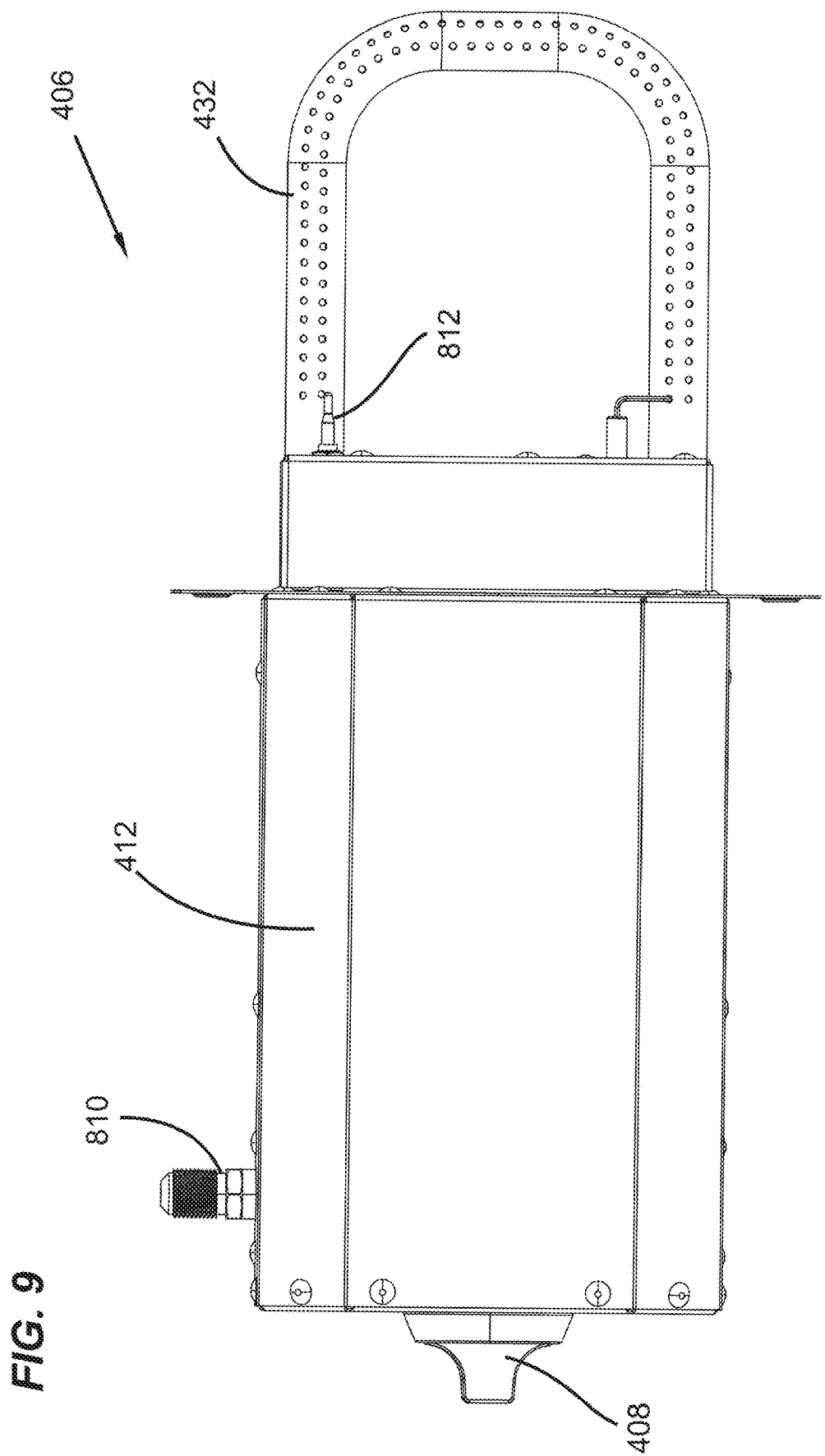
FIG. 9 shows additional aspects of the gas burner of FIG. 8.
Figure 10:
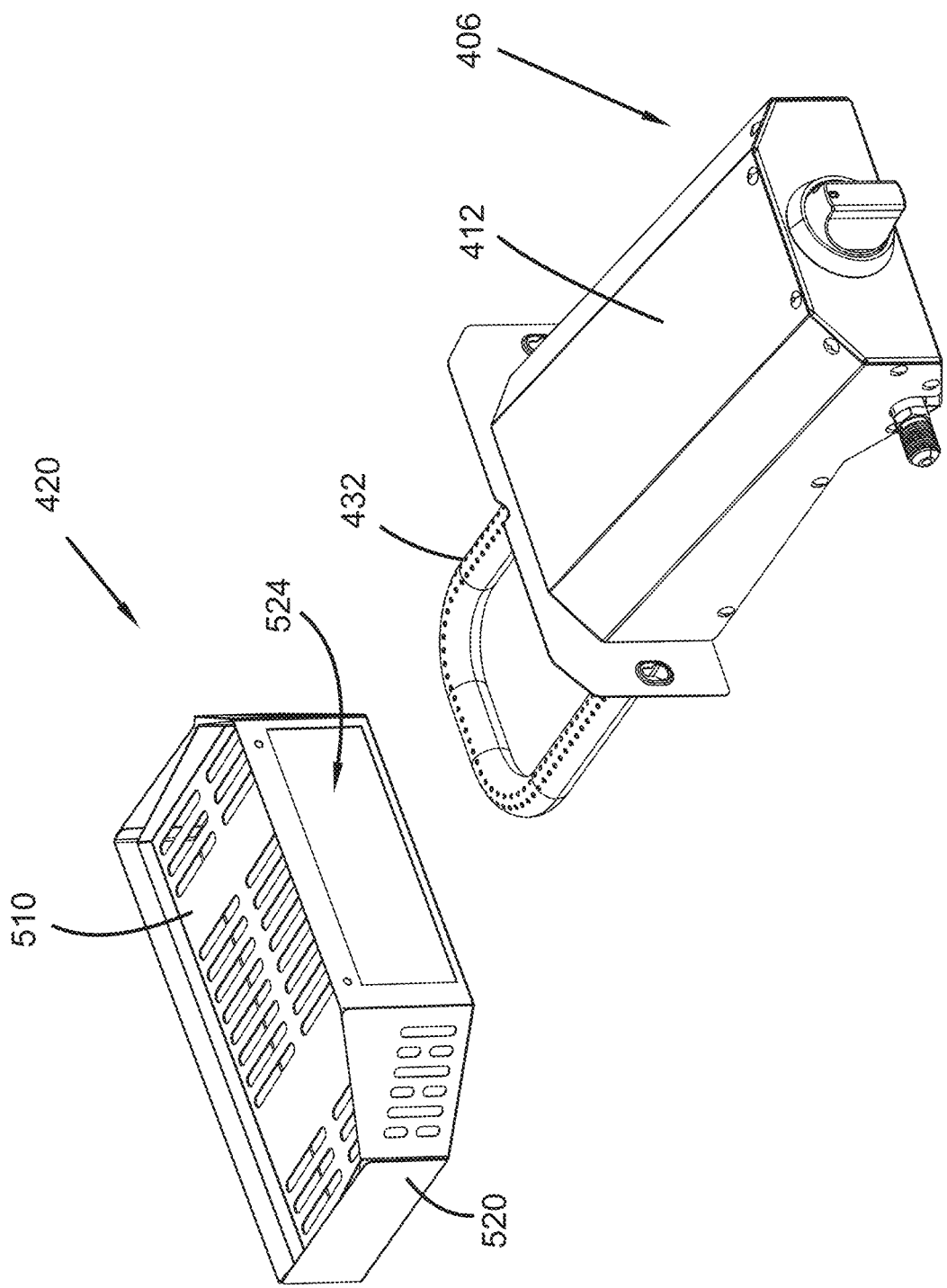
FIG. 10 shows the wood burning tray assembly and the gas burner of the oven of FIG. 1 in isolation in an uncoupled state.
Figure 11:
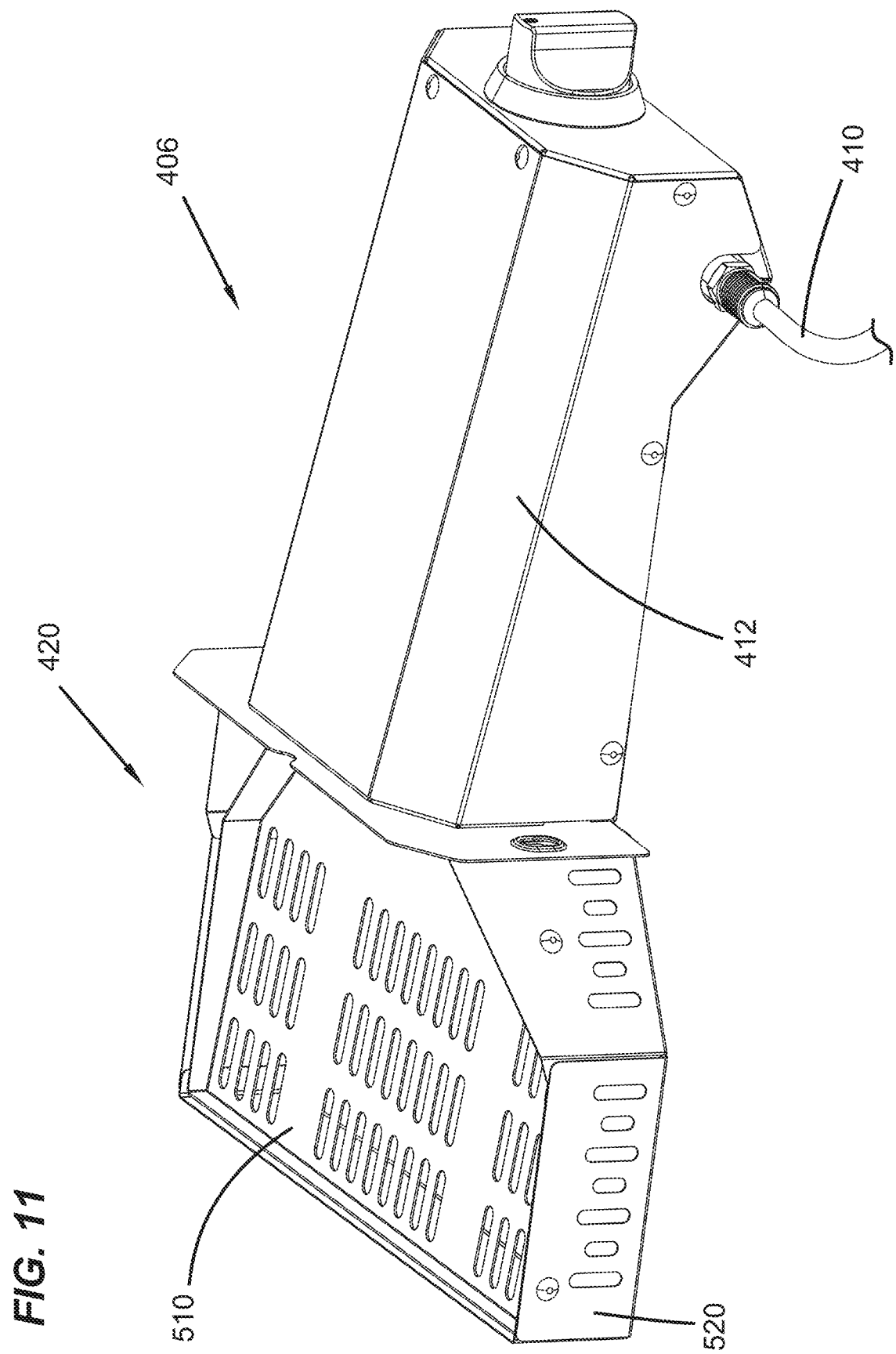
FIG. 11 shows the wood burning tray assembly and the gas burner of the oven of FIG. 1 in isolation in a coupled state.
Figure 12:
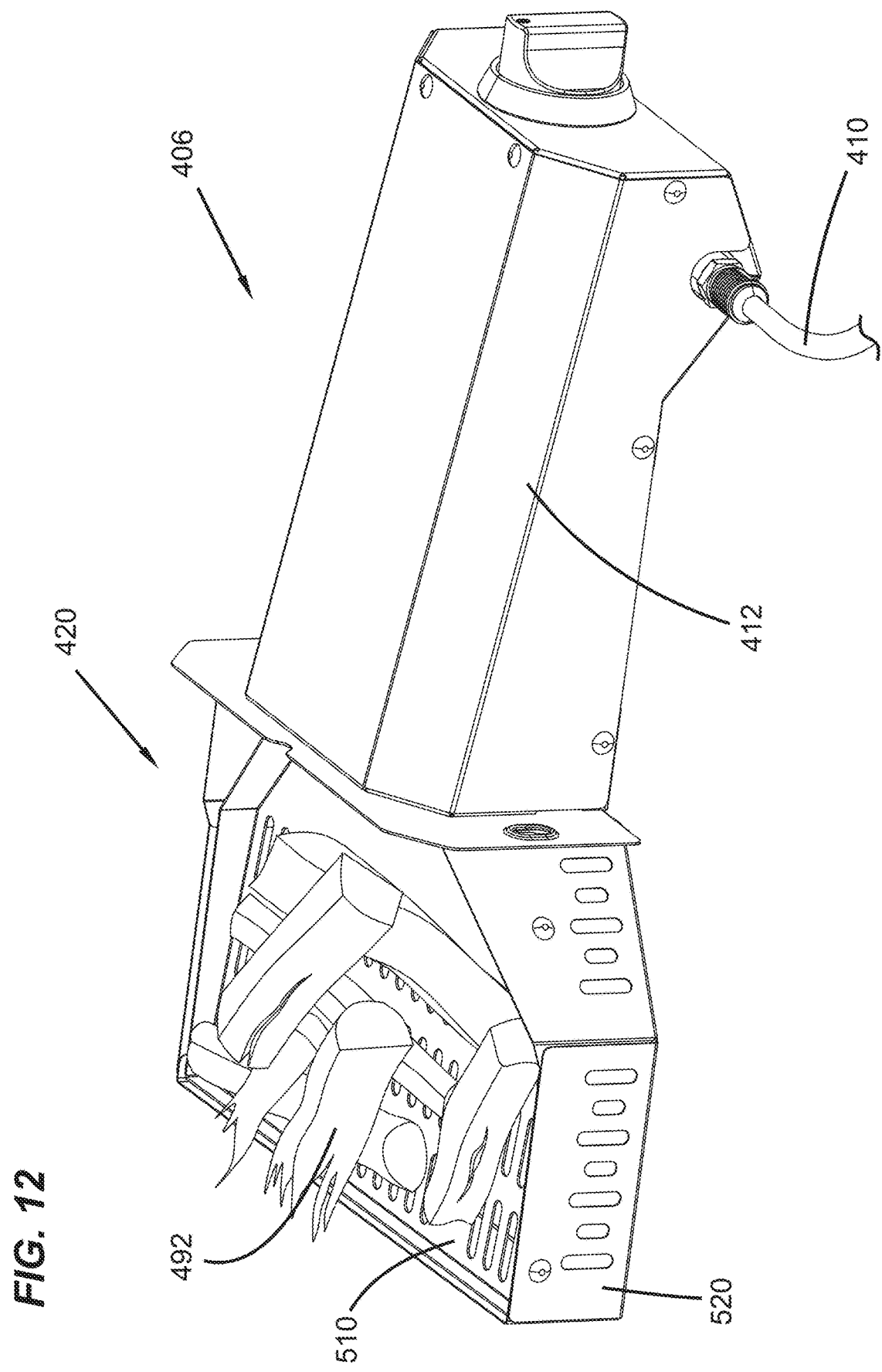
FIG. 12 shows the wood burning tray assembly and the gas burner of the oven of FIG. 11 with wood.
Figure 13:
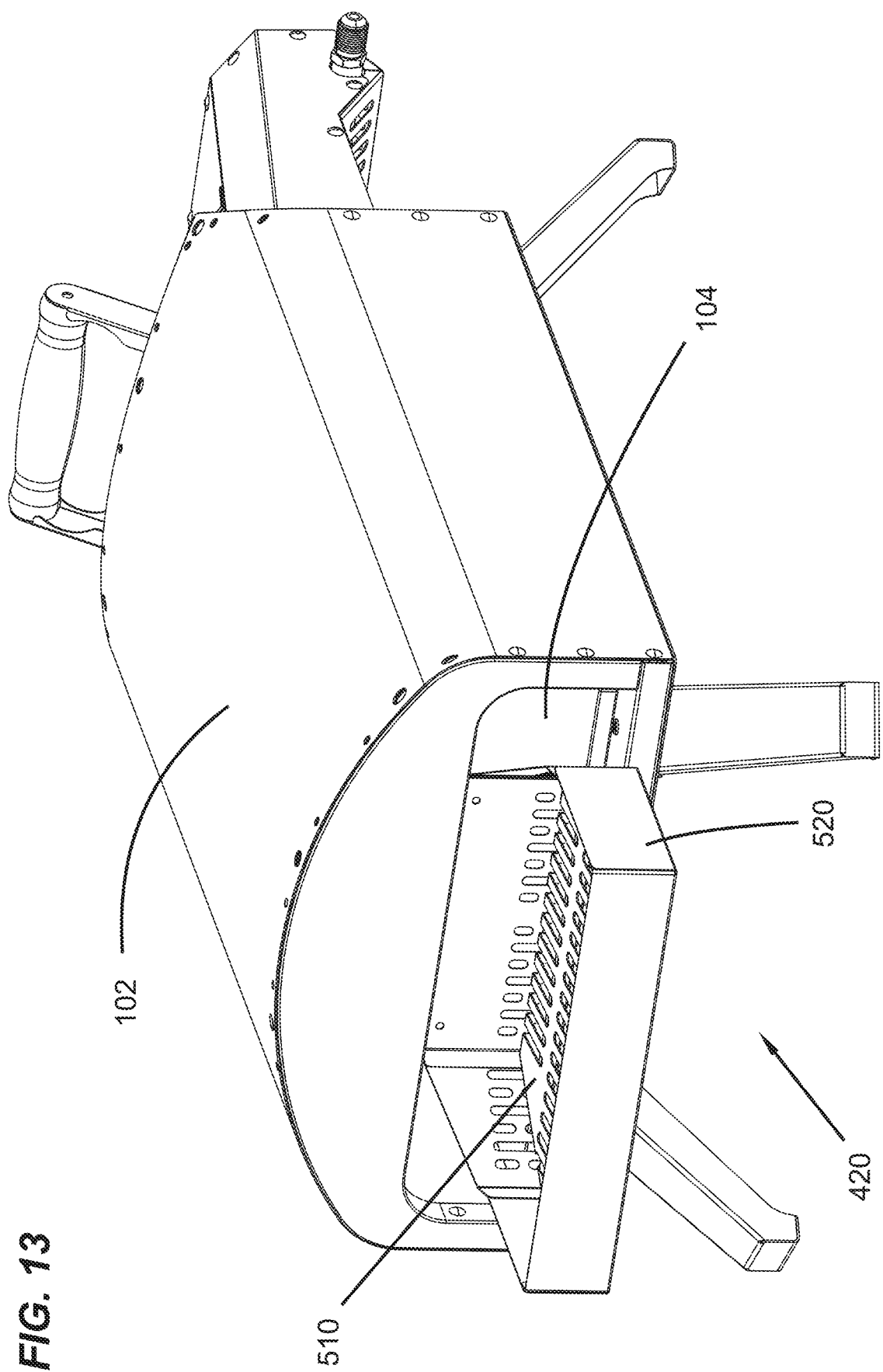
FIG. 13 shows the wood burning tray assembly being inserted into the oven of FIG. 1.
Figure 14:
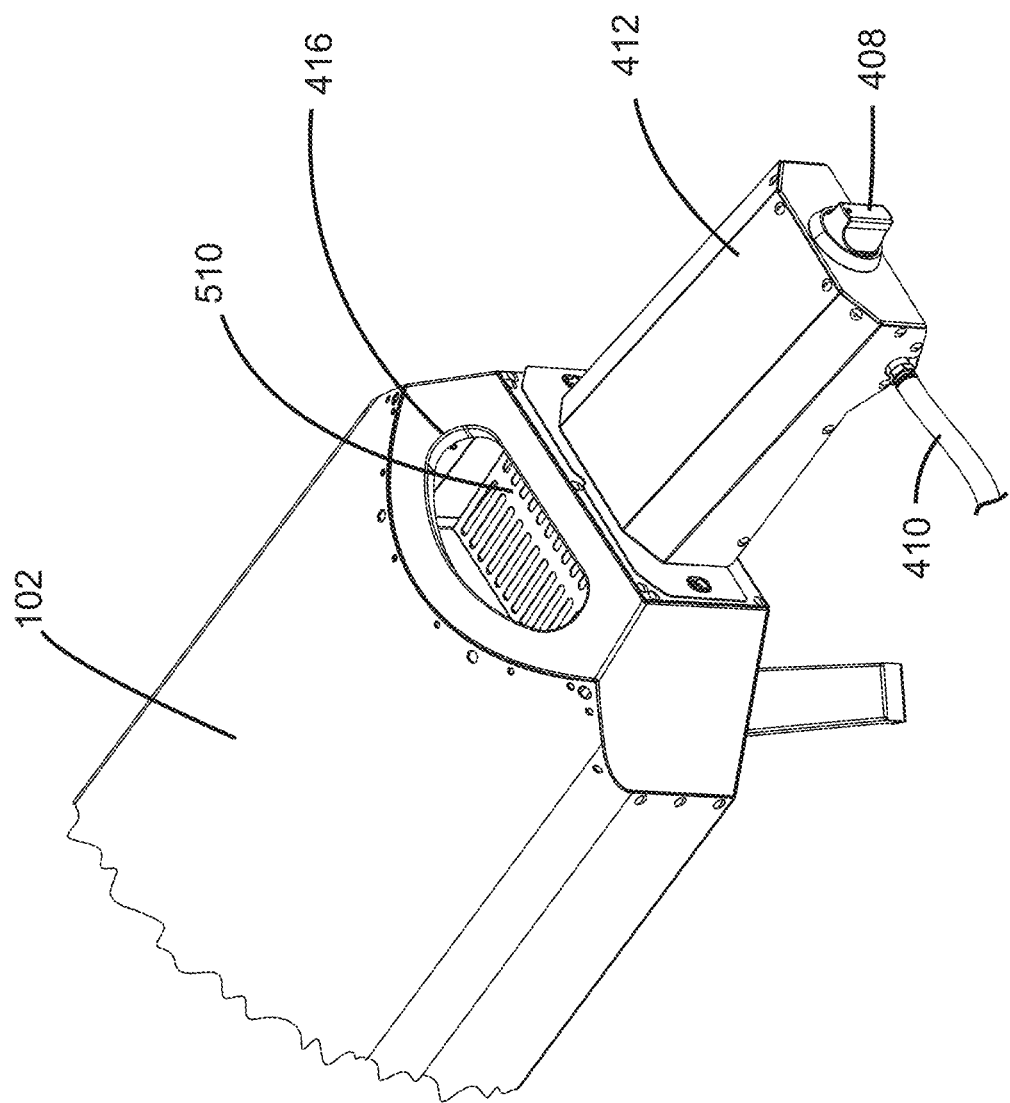
FIG. 14 shows additional aspects of the oven of FIG. 1.
Figure 15:
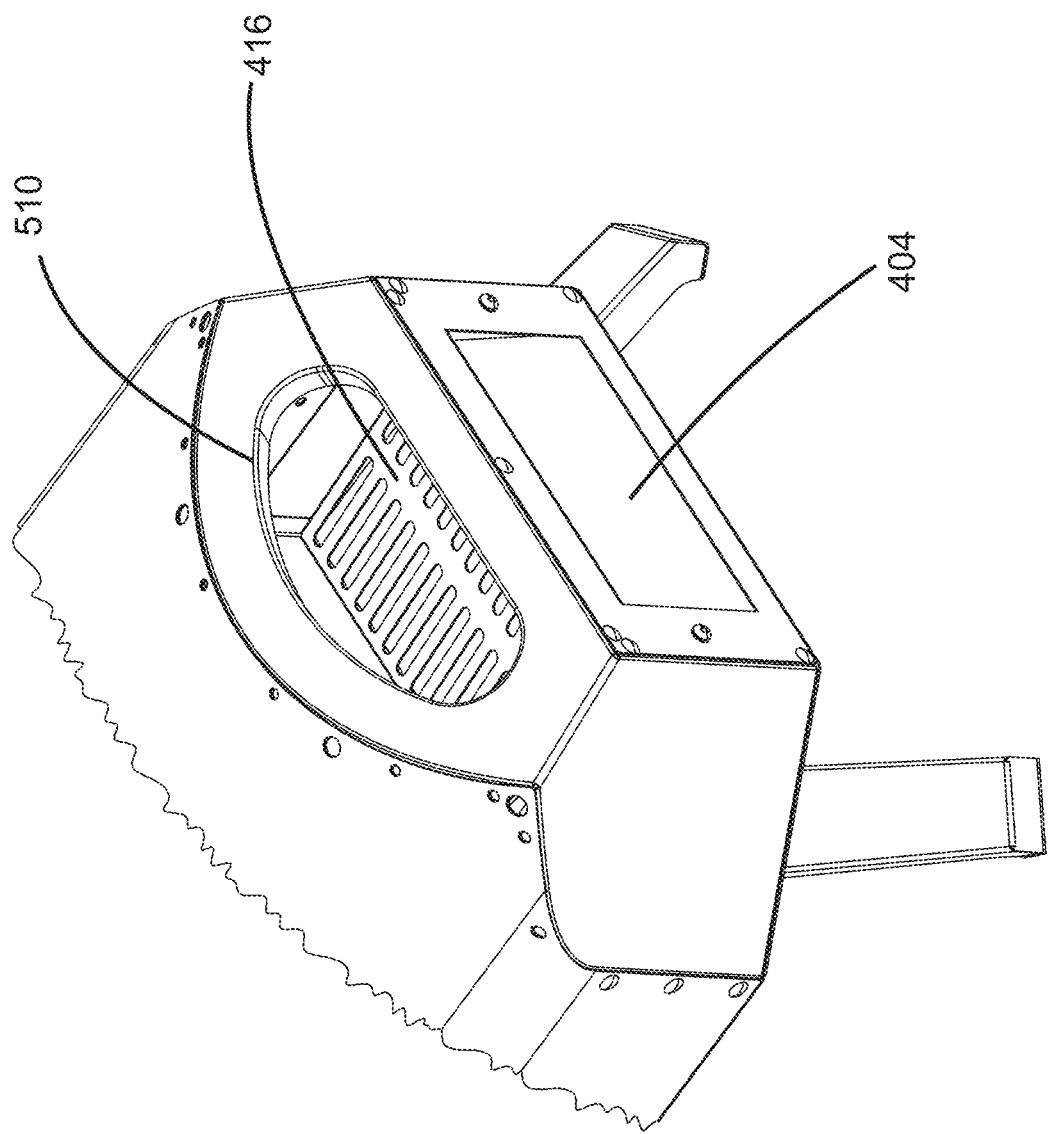
FIG. 15 shows additional aspects of the oven of FIG. 1.
Figure 16:
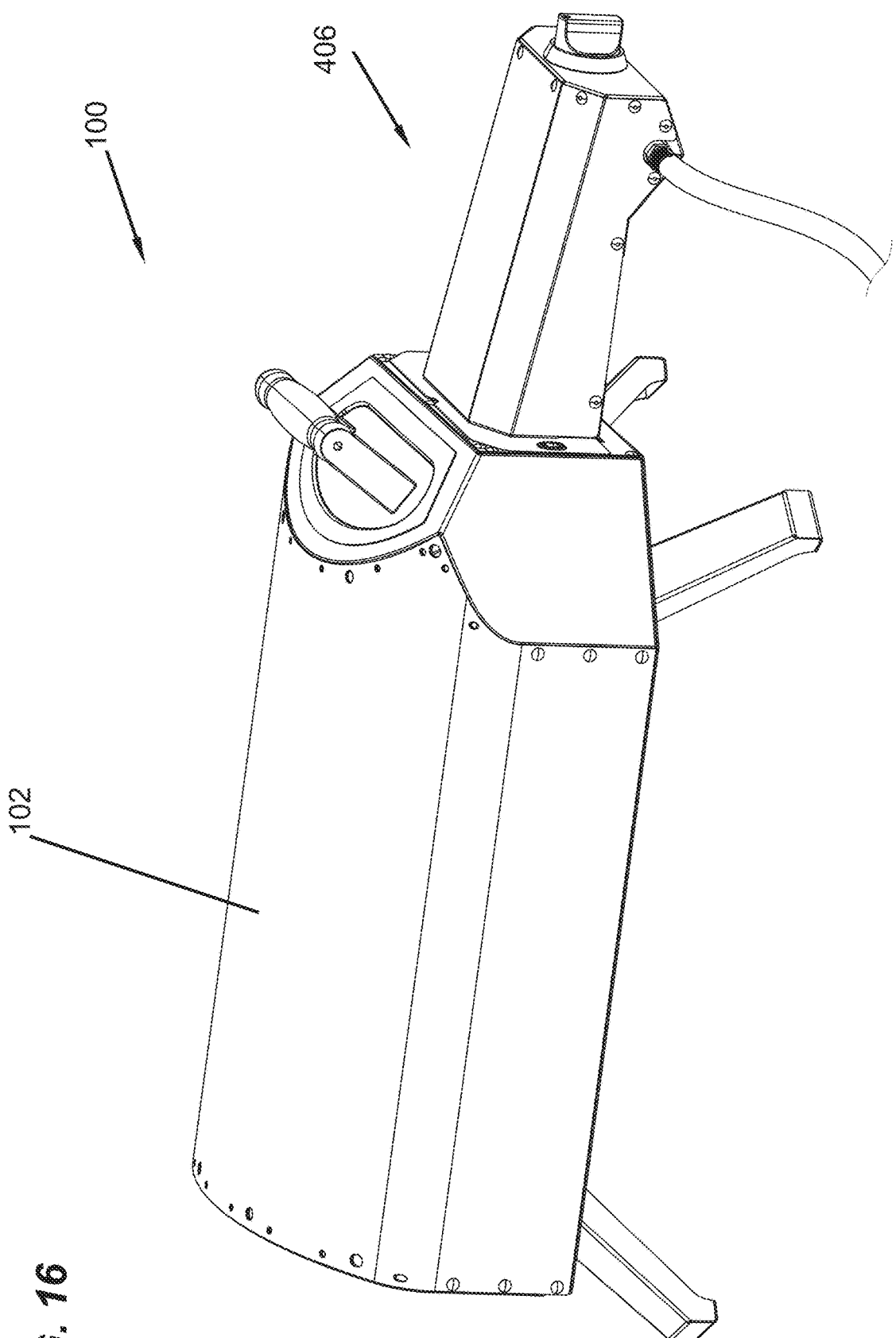
FIG. 16 shows additional aspects of the oven of FIG. 1.
Figure 17:
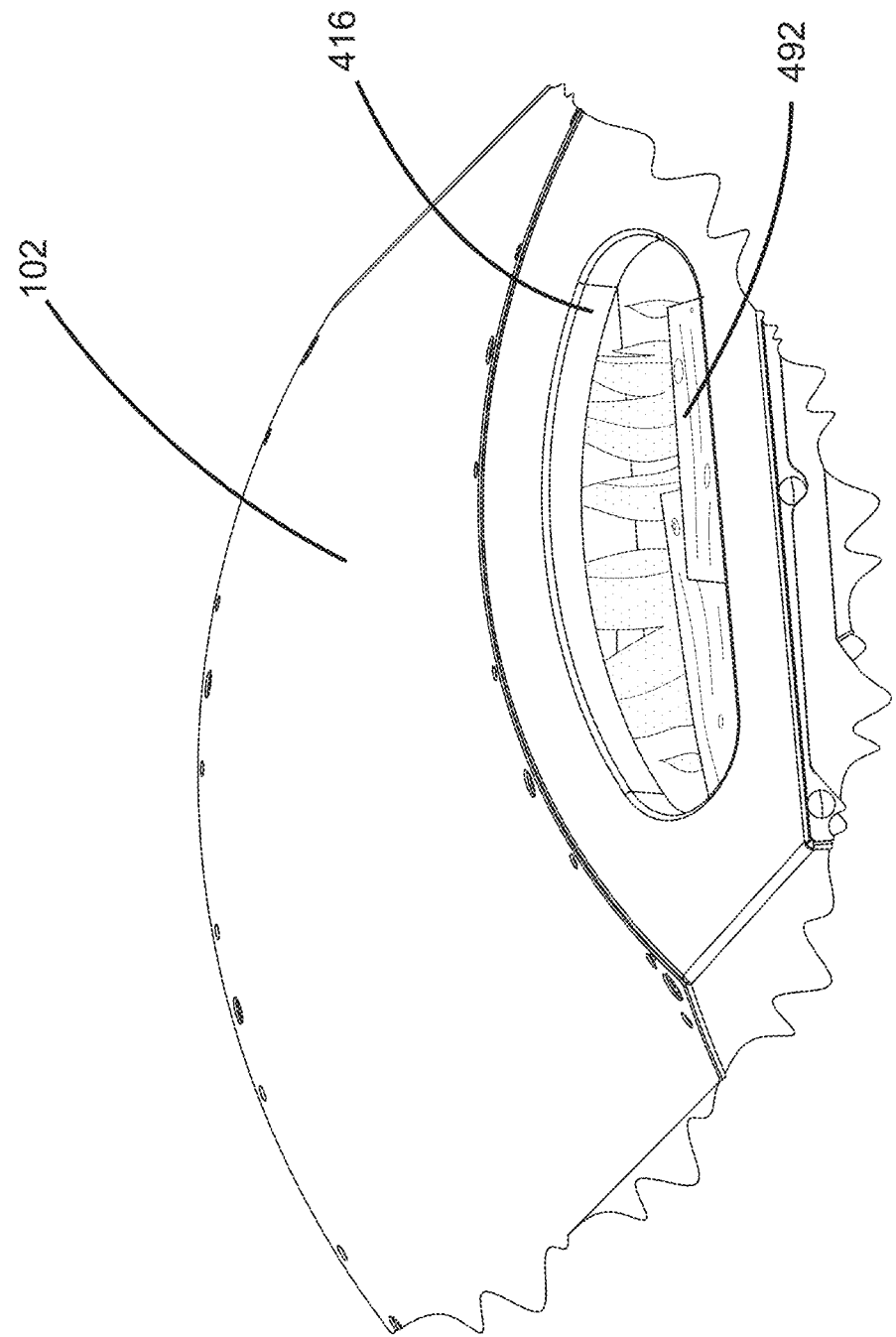
FIG. 17 shows additional aspects of the oven of FIG. 1.
Figure 18:
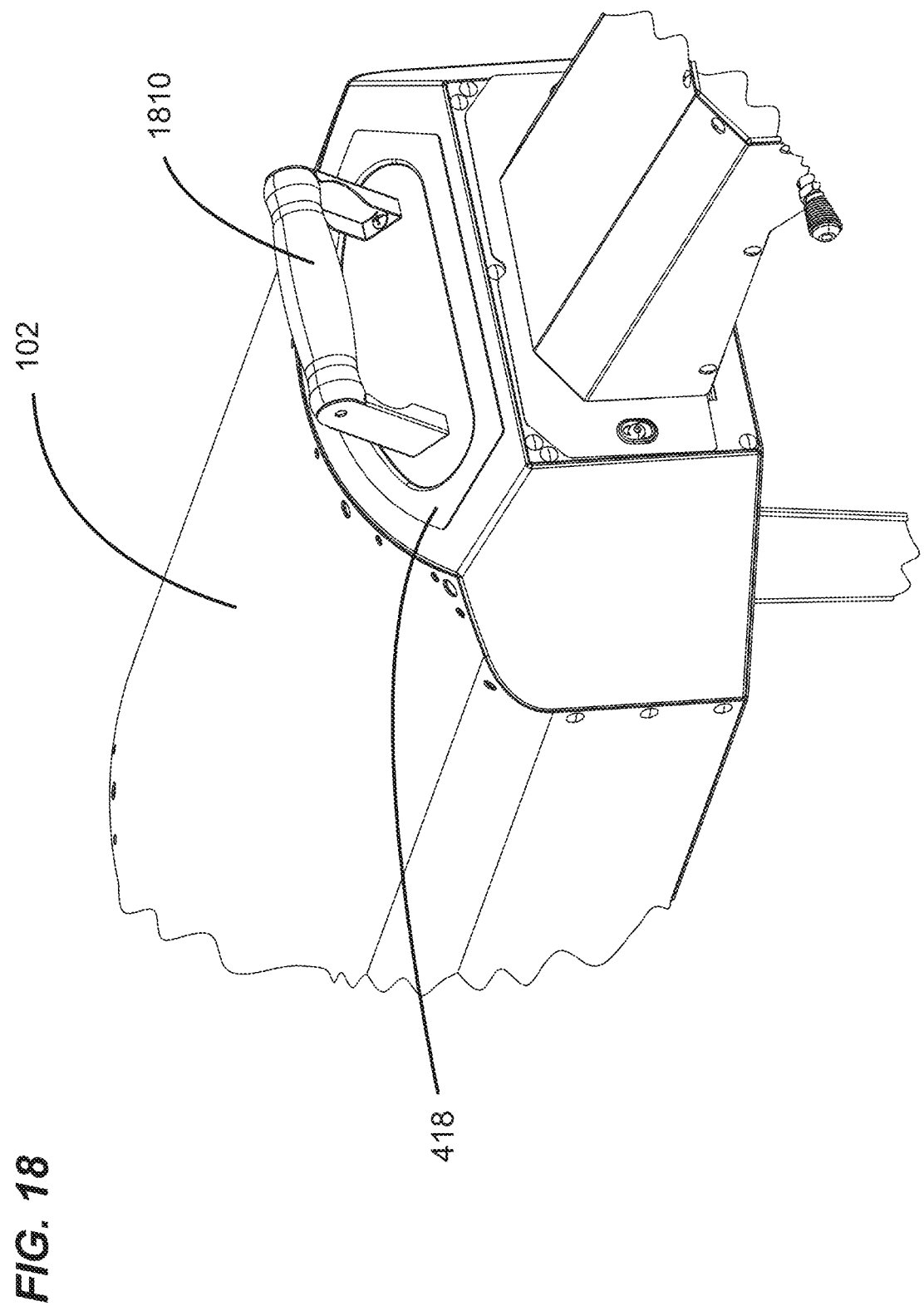
FIG. 18 shows additional aspects of the oven of FIG. 1.
Figure 19:
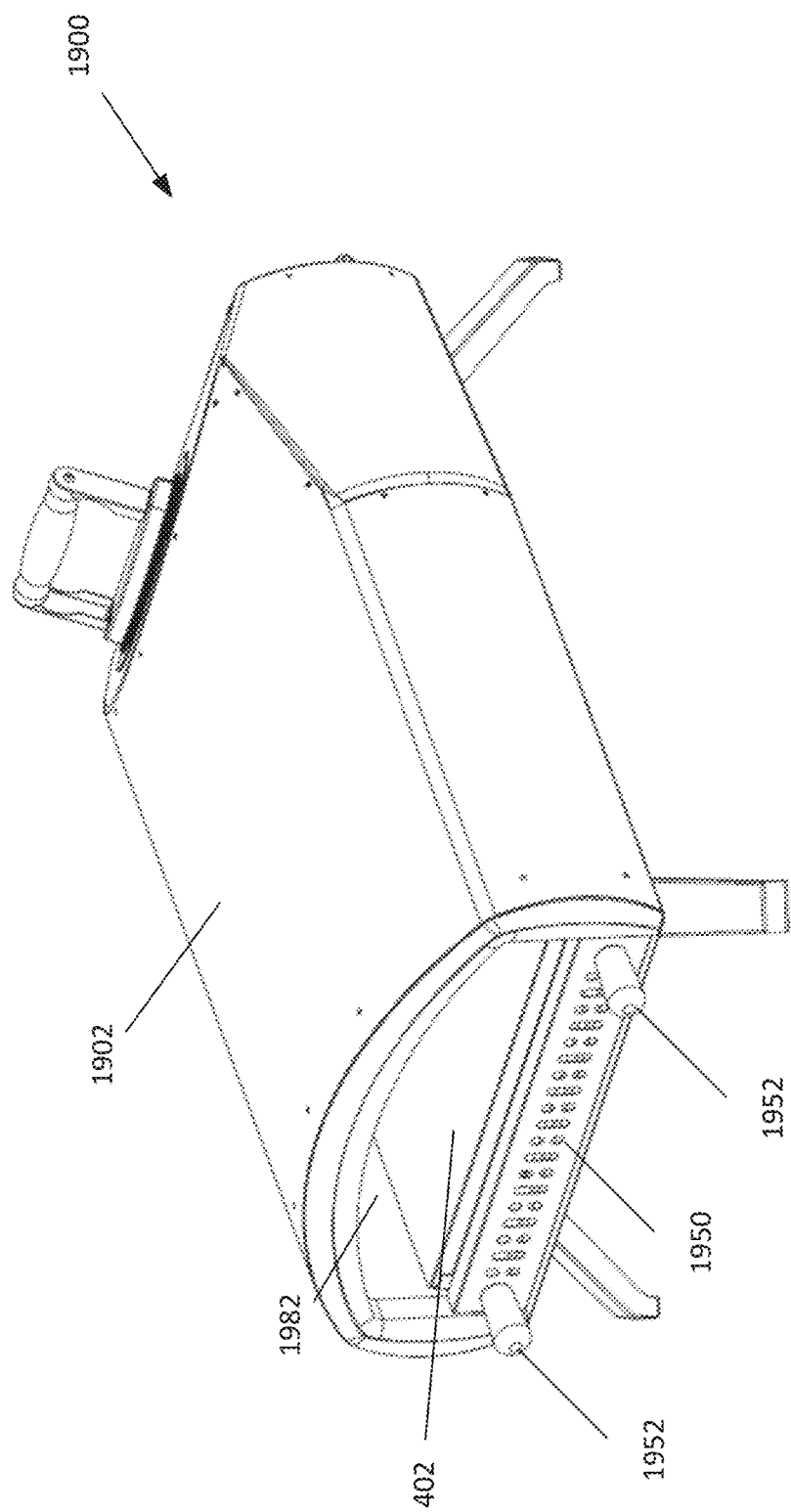
FIG. 19 shows another example oven configured to use multiple fuel sources.
Figure 20:
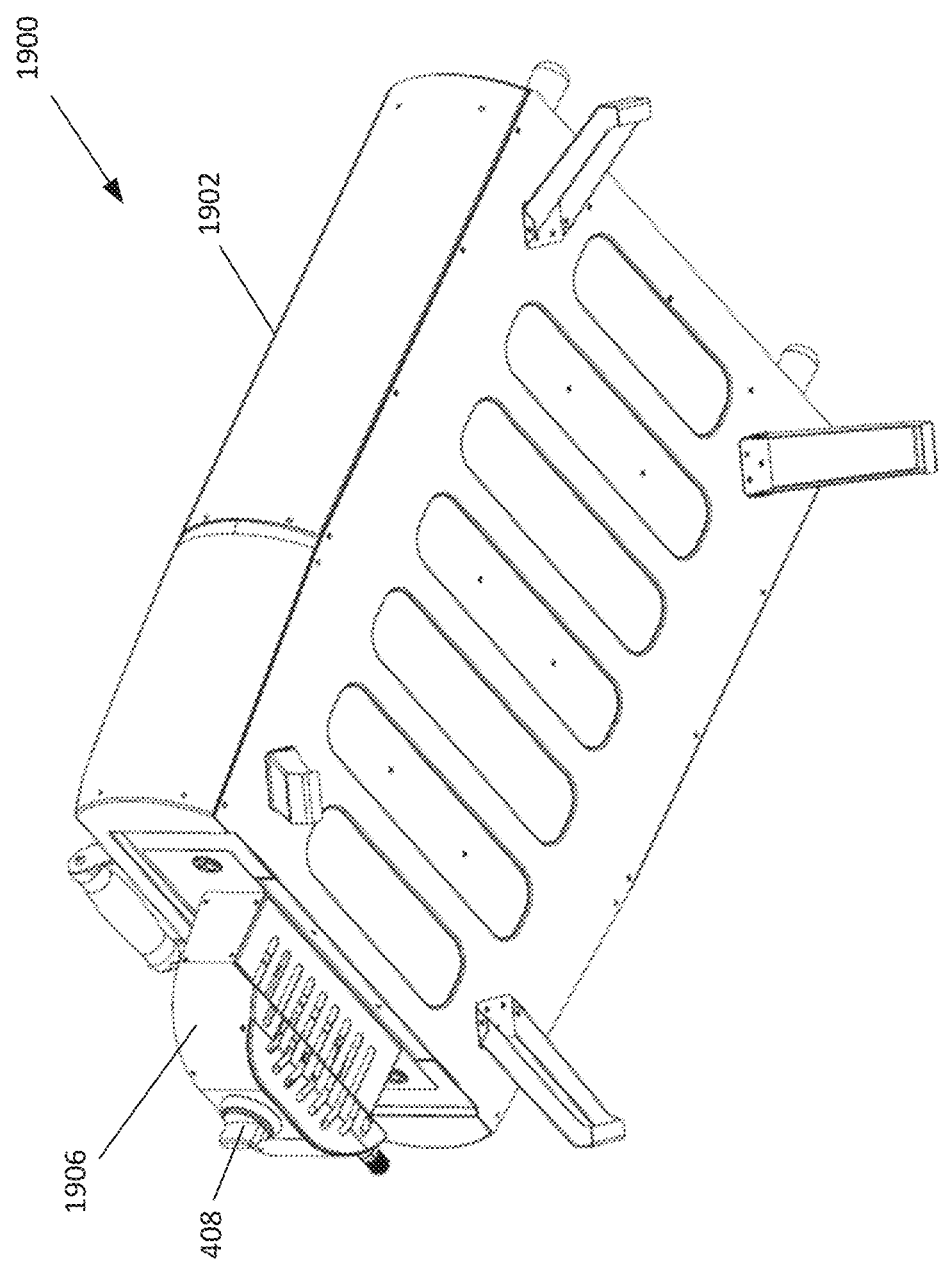
FIG. 20 shows additional aspects of the oven of FIG. 19.
Figure 21:
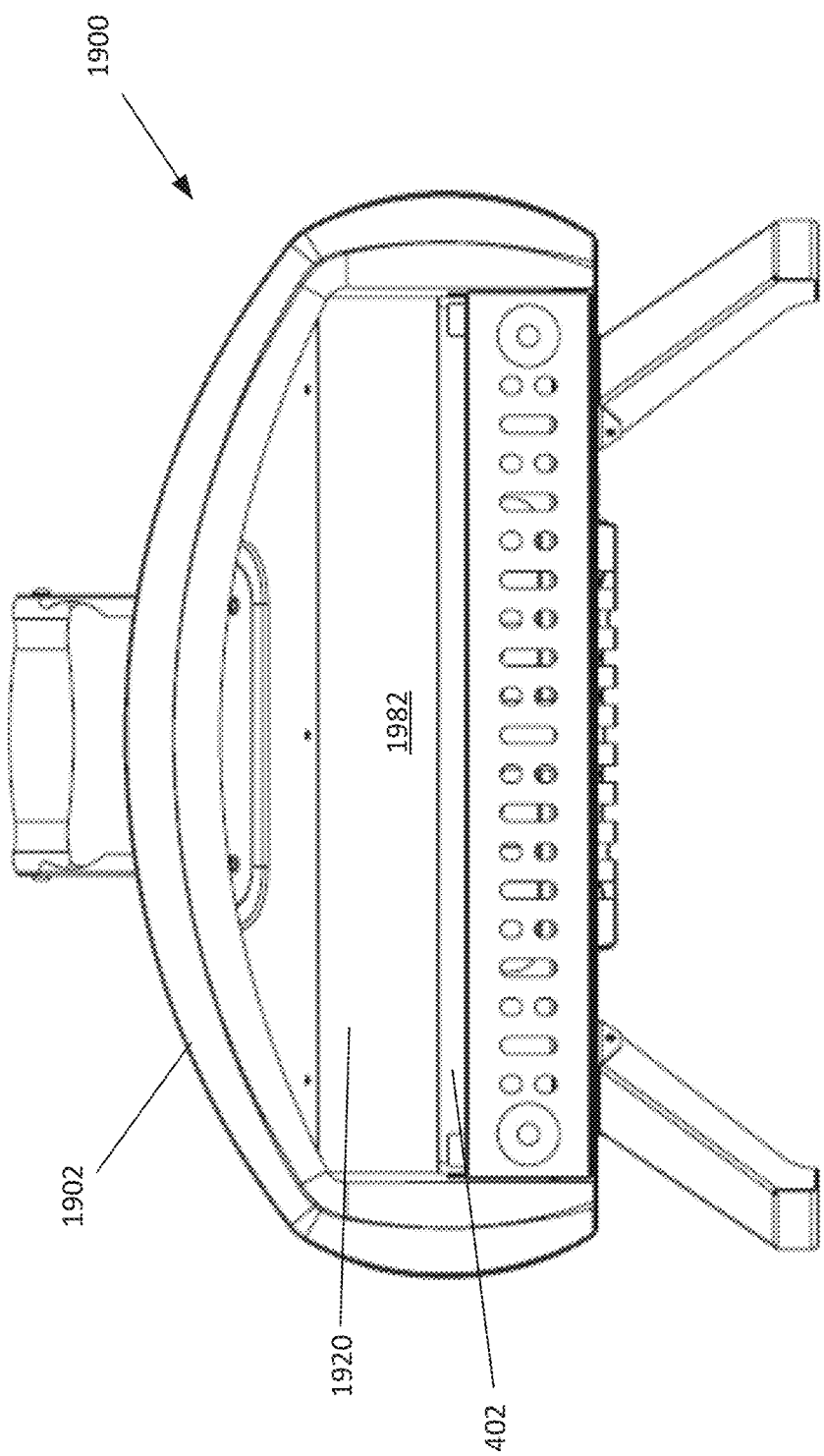
FIG. 21 shows additional aspects of the oven of FIG. 19.
Figure 22:
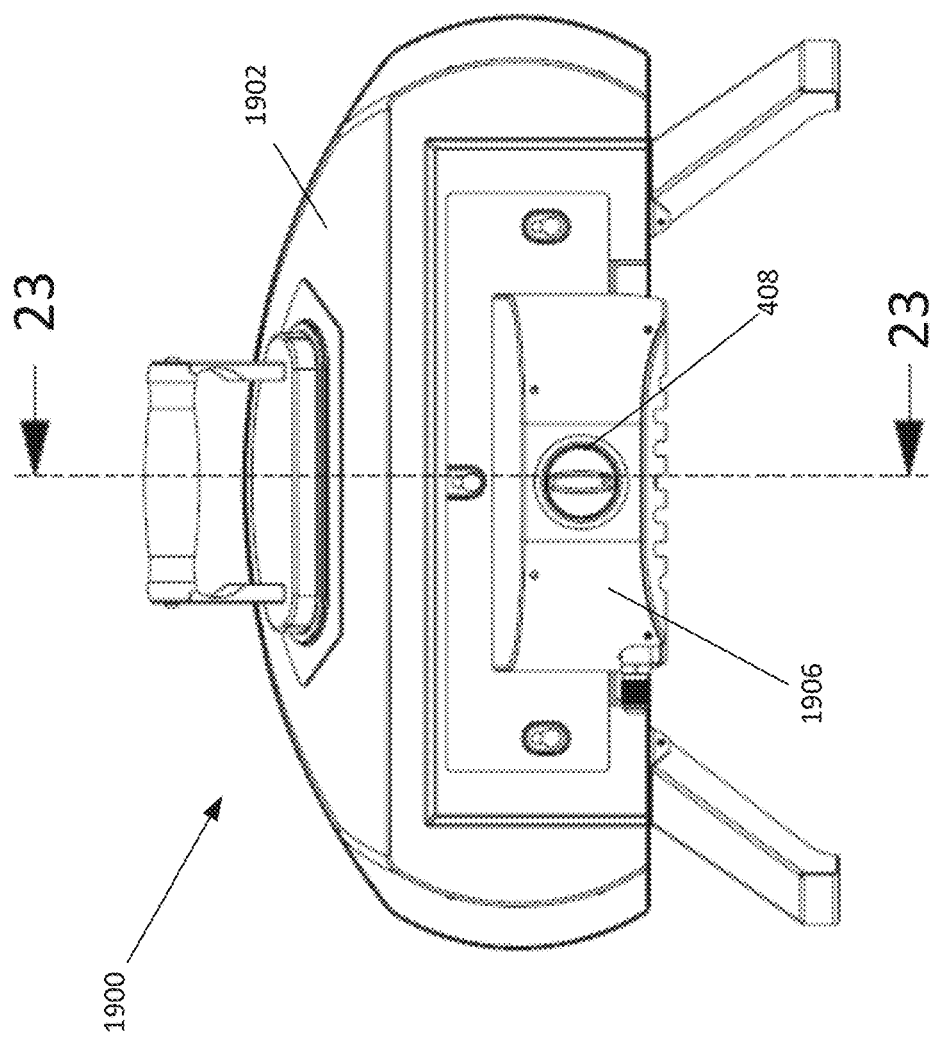
FIG. 22 shows additional aspects of the oven of FIG. 19.
Figure 23:
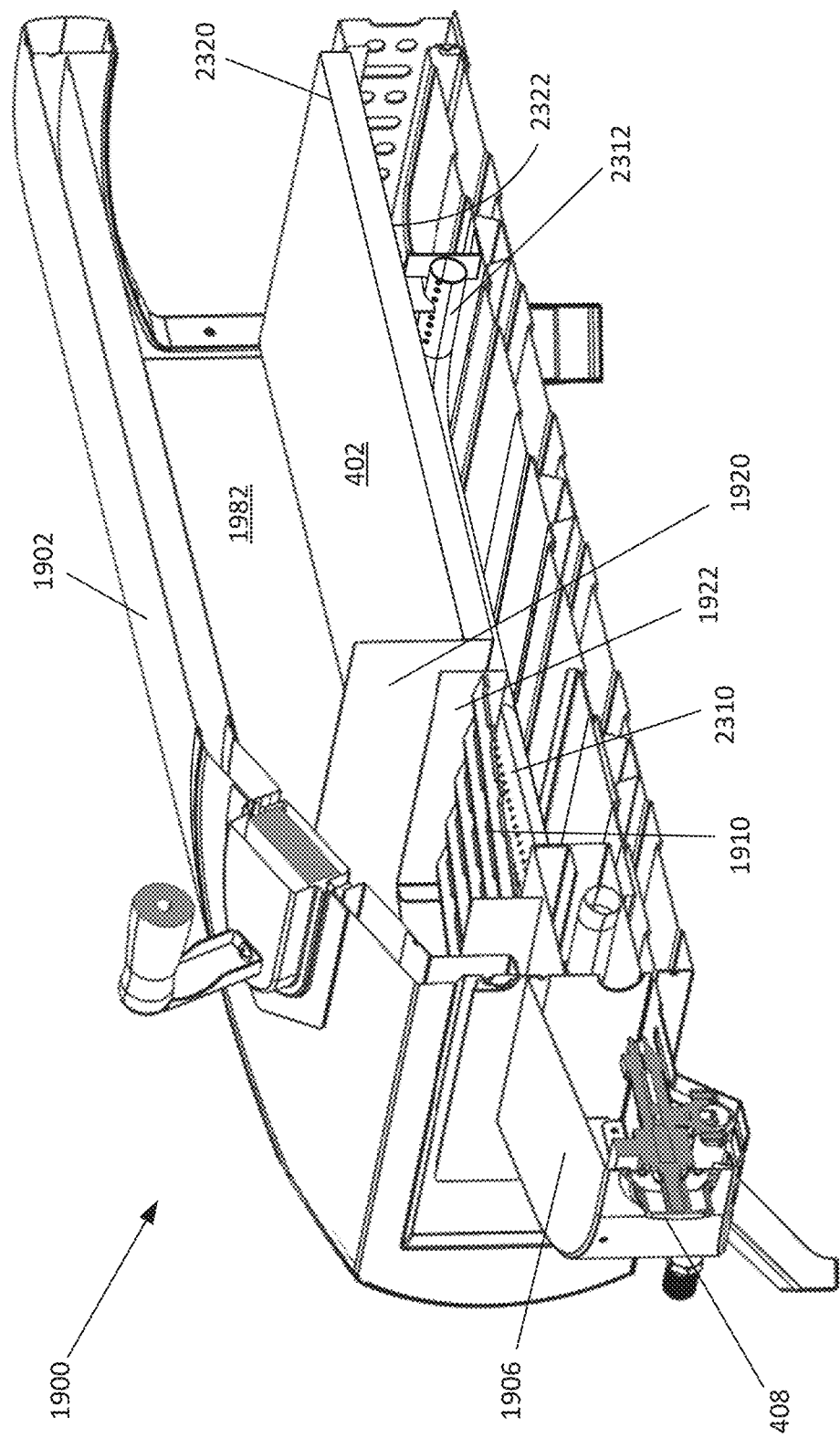
FIG. 23 shows a cross-sectional view of the oven of FIG. 19.
Figure 24:
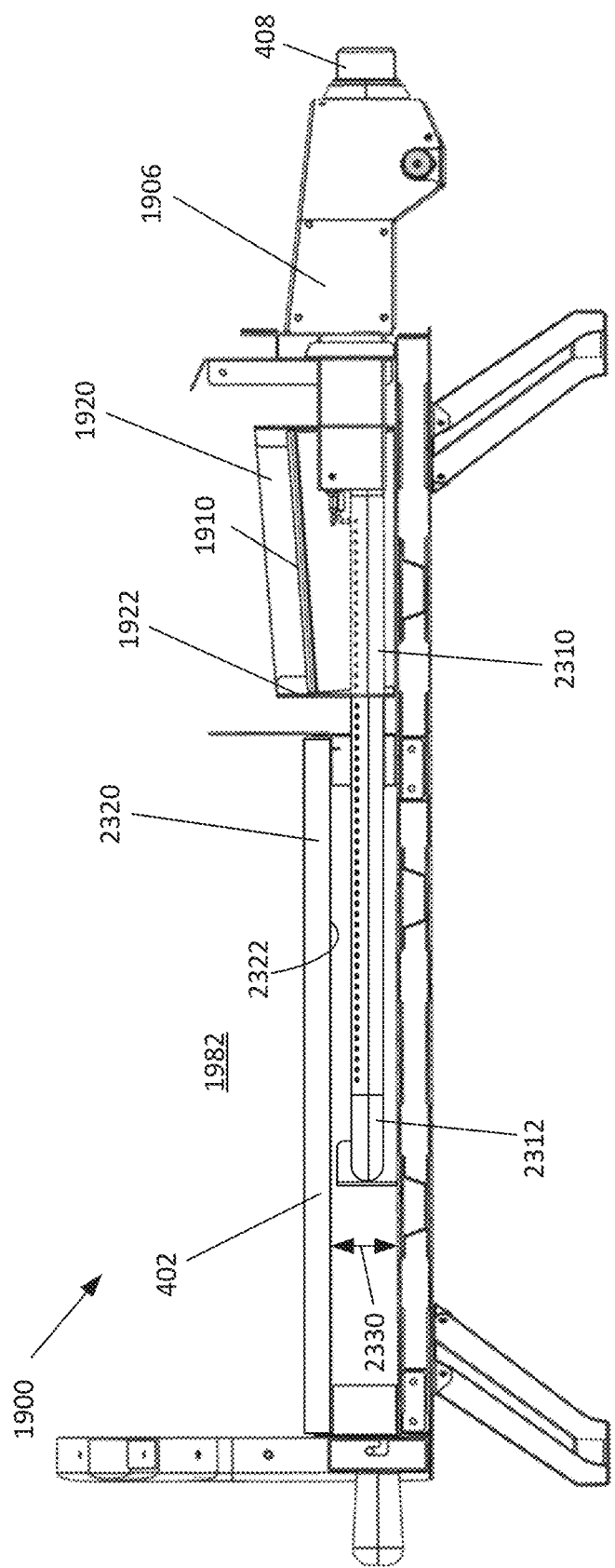
FIG. 24 shows additional aspects of the oven of FIG. 19 with some components being removed or transparent.
Figure 25:
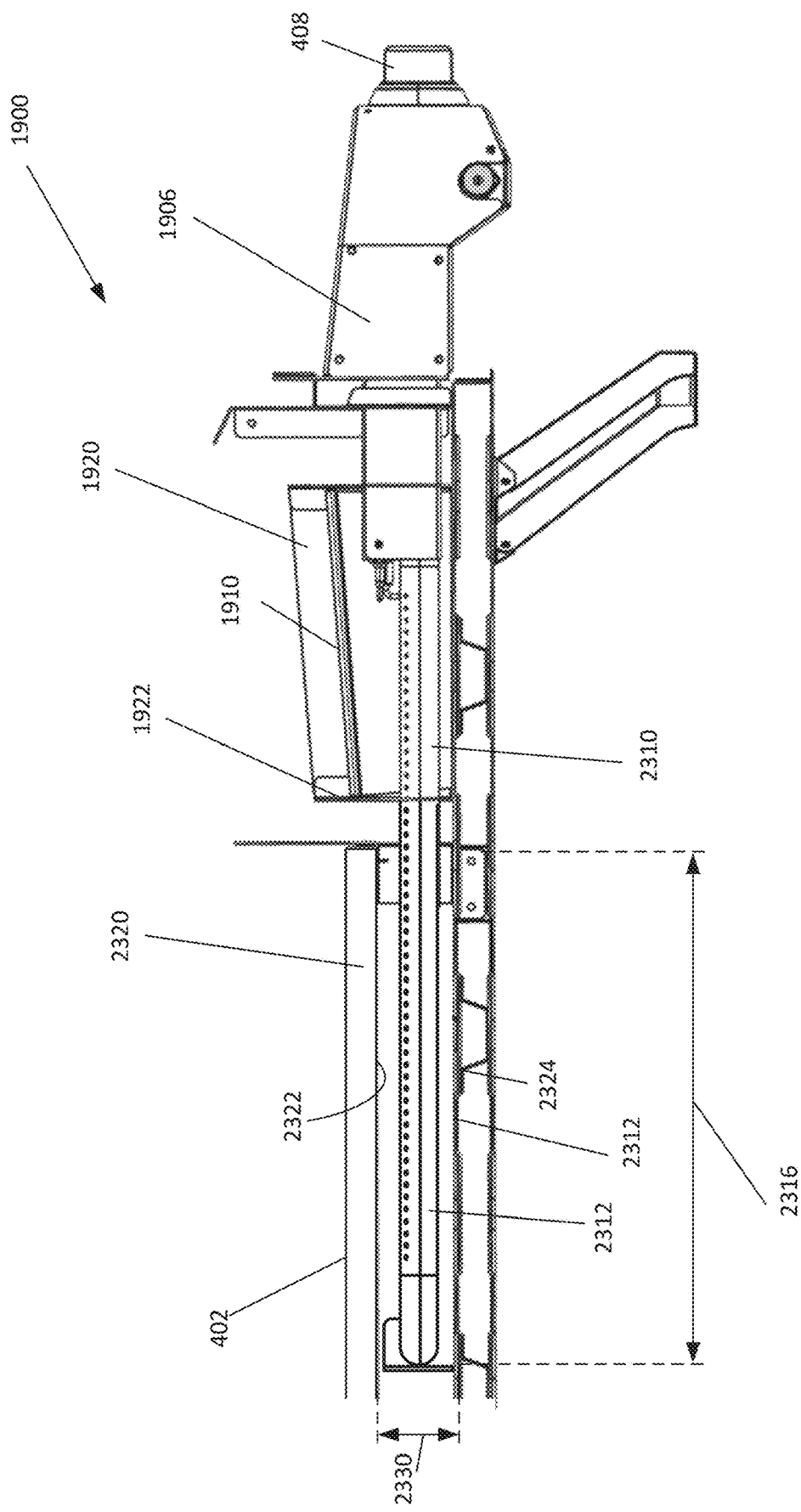
FIG. 25 shows an enlarged view of a portion of FIG. 23.
Figure 26:
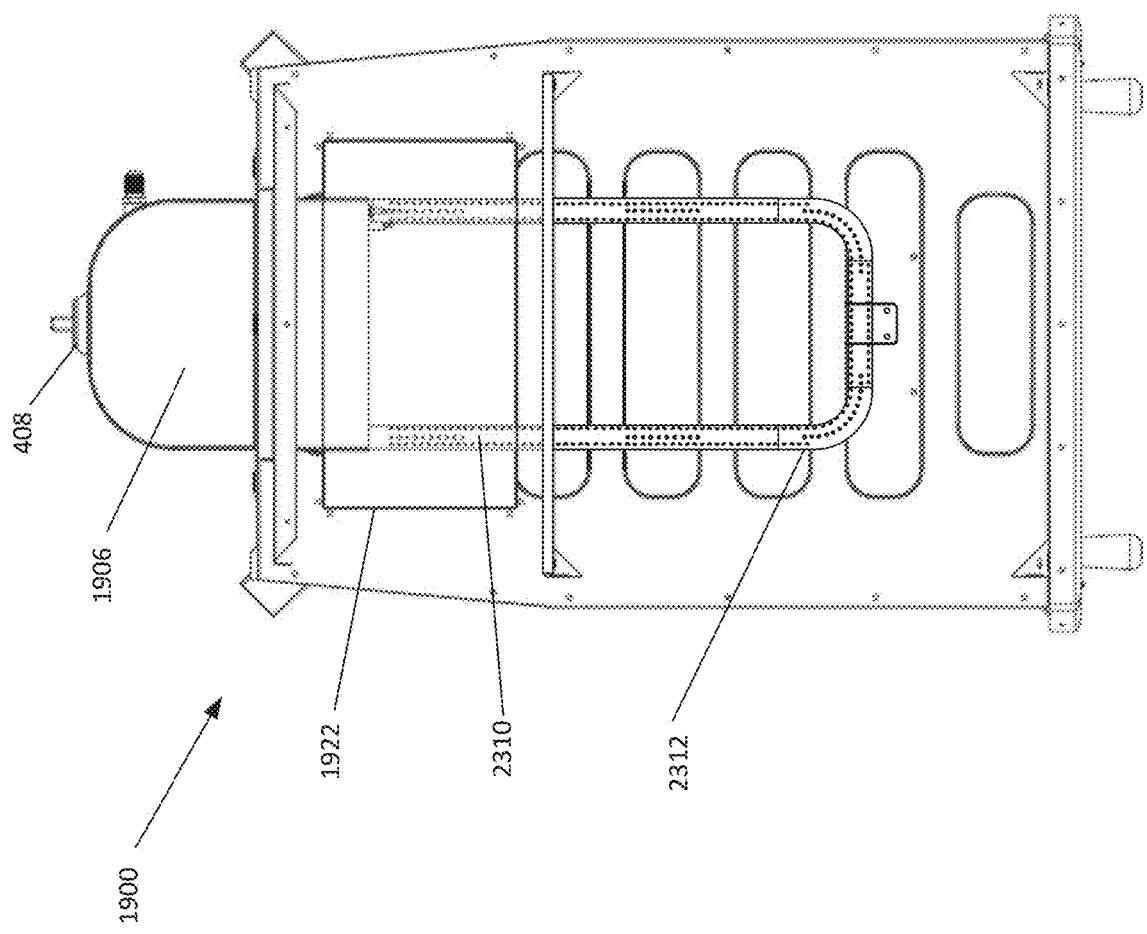
FIG. 26 shows additional aspects of the oven of FIG. 19 with some components being removed or transparent.
Figure 27:
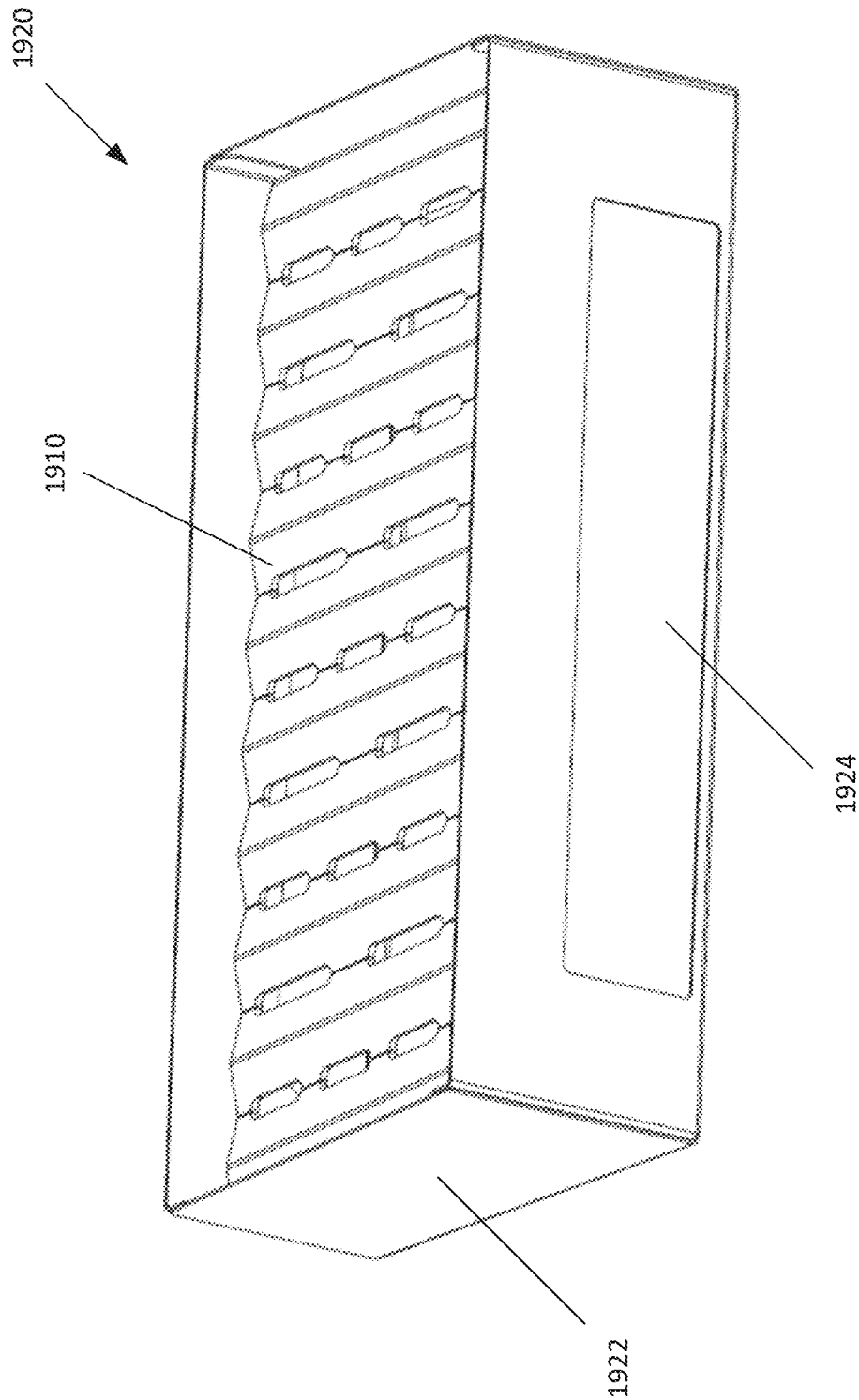
FIG. 27 shows an example wood burning tray assembly of the oven of FIG. 19.
Figure 28:
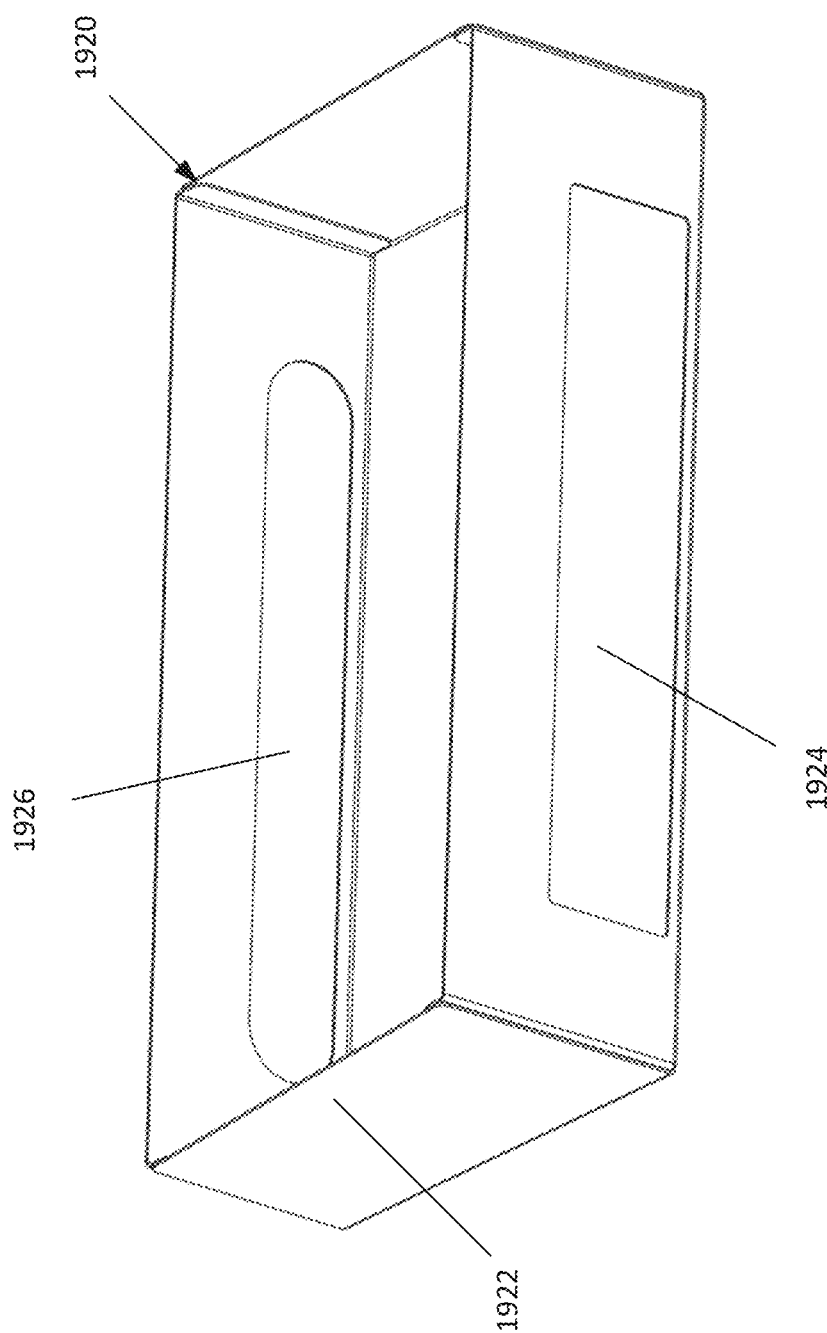
FIG. 28 shows additional aspects of the wood burning tray assembly of FIG. 27.
Figure 29:
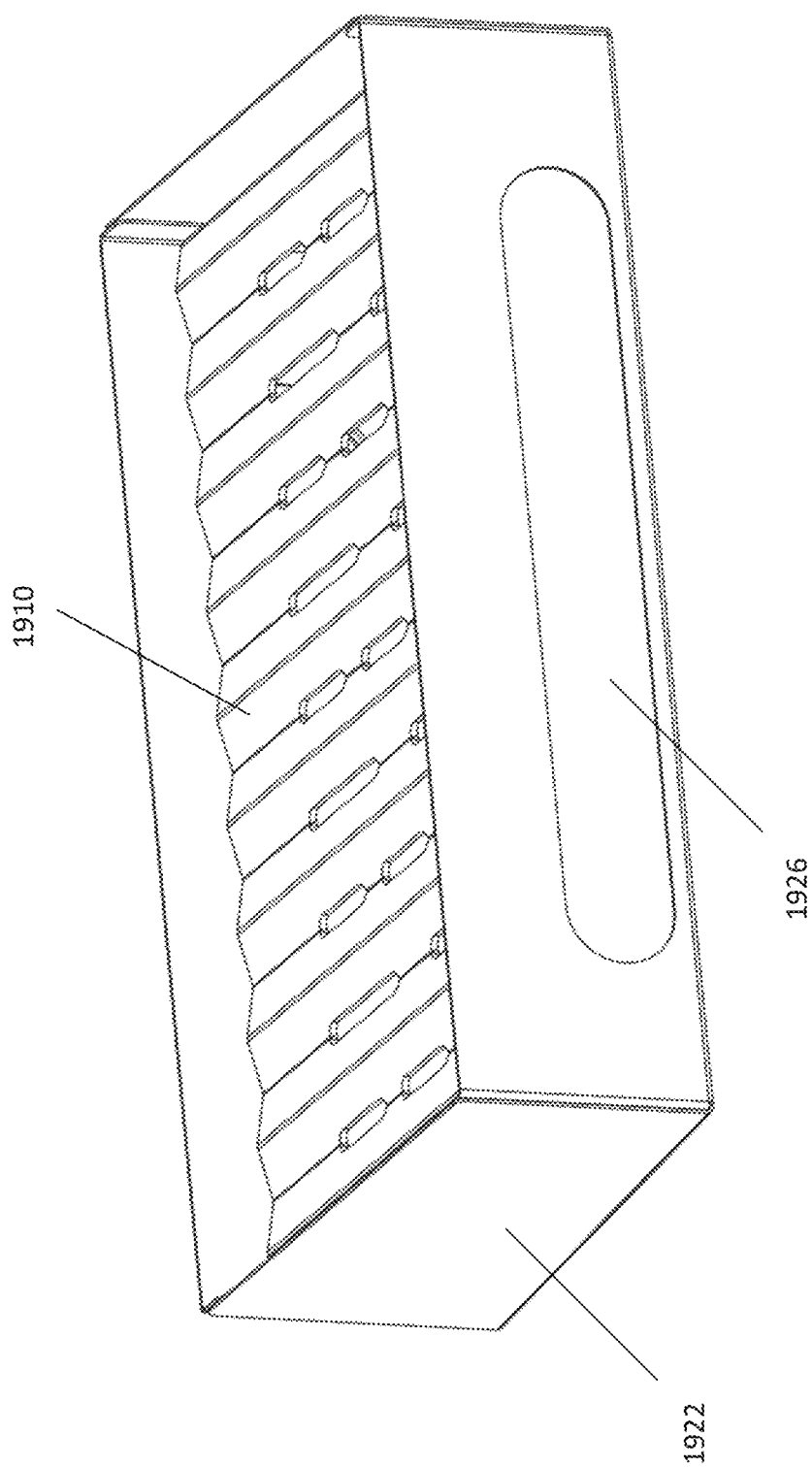
FIG. 29 shows additional aspects of the wood burning tray assembly of FIG. 27.
Figure 30:
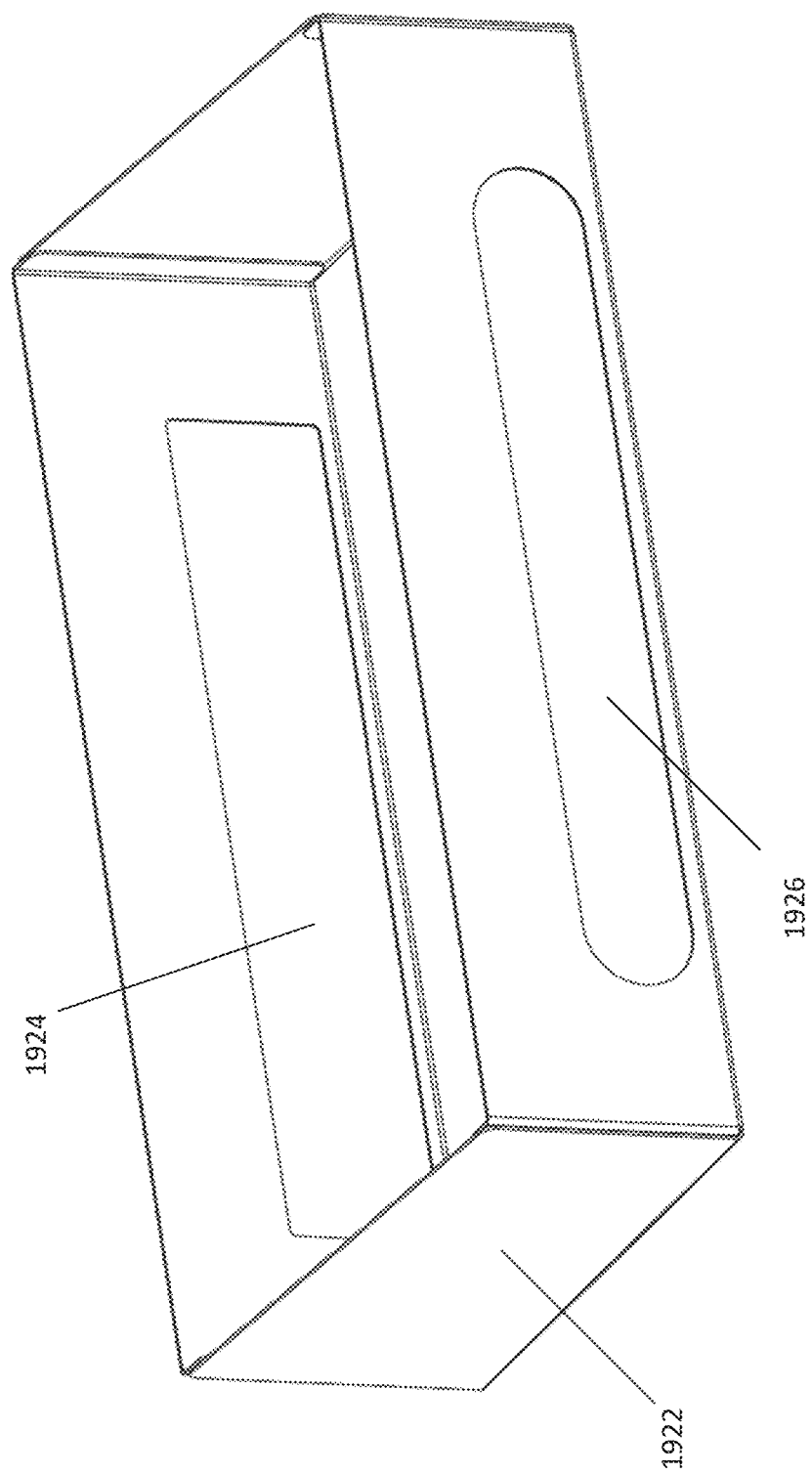
FIG. 30 shows additional aspects of the wood burning tray assembly of FIG. 27.
Figure 31:
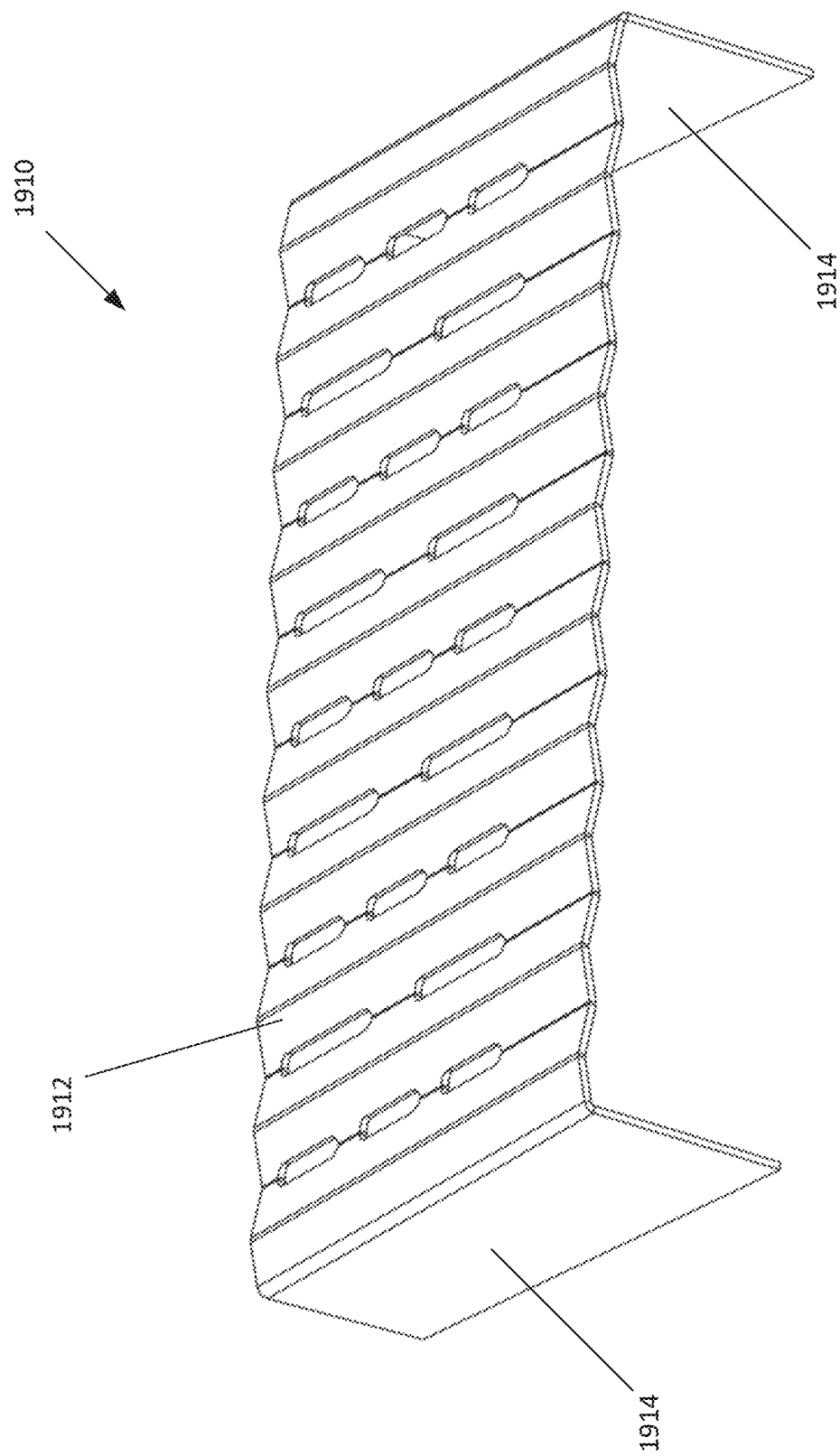
FIG. 31 shows an example grate of the wood burning tray assembly of FIG. 27.

In examples provided herein, an oven is provided to cook various food items. In these examples, the oven can be generally rectangular and used to cook a pizza, such a Neapolitan style pizza.

The oven can use a variety of fuel types, including gas (propane), natural gas, wood, charcoal, and/or wood pellets, to heat up to 900+ degrees Fahrenheit in a short amount of time. One example of an oven that can use a variety of fuel types (e.g., wood and gas) is provided in U.S. patent application Ser. No. 62/608,185 filed on Dec. 20, 2017.

In the examples provided herein, the oven allows one to use multiple fuel sources to cook. In one example, this includes using both gas and wood fuel sources at the same time. Generally, a gas burner provides a quick, reliable source of heat. The gas burner, in turn, can be used to ignite and burn wood placed in the oven adjacent to the gas burner.

In the provided examples, the gas burner slides into the specially designed wood tray, allowing one to put wood on top of the gas burner. This allows the gas burner to quickly heat the oven and maintain a consistent temperature. Then, one can add wood to the oven, which can be ignited by the gas burner. The wood provides that natural, smoky wood flavor in the pizza. The embodiments provided herein maintain the burning of the wood because the gas burner is provided adjacent to (e.g., below) the wood.

Additional details for the example oven are provided in the accompanying drawings, which are hereby incorporated by reference in their entirety.

Referring now to FIGS. 1-4, an example oven 100 is shown. The oven 100 includes a generally rectangular body 102 formed of an inner shell 302 and an outer shell 304. The body 102 forms a cooking cavity 482 therein. In this example, a layer of insulation can be positioned between the inner shell 302 and the outer shell 304 to help maintain a more consistent temperature for the cooking cavity 482.

Referring now to FIGS. 4-17, in the example depicted, the oven 100 is fueled by both a gas burner 406 and wood held by a wood burning tray assembly 420. Specifically, heat from the gas burner 406 heats the oven 100 and ignites wood 492 on the wood burning tray assembly 420.

In this example, a Neapolitan style pizza 490 (or other food item) is positioned on a removable baking stone 402 (e.g., made of cordierite) within the oven 100. The heat generated by the gas burner 406 and the burning wood 492 held by the wood burning tray assembly 420 increases the temperature of the cooking cavity 482 to a desired temperature (e.g., approx. 900+ degrees Fahrenheit) to cook the Neapolitan style pizza 490 in a short amount of time (e.g., approx. 90 seconds).

More specifically, the oven 100 is heated from the back by the gas burner 406 and the burning wood 492 positioned on the wood burning tray assembly 420. The heat and smoke rises to a ceiling 460 of the oven 100, then moves towards a front cooking area 462 of the cooking cavity 482, where the Neapolitan style pizza 490 is positioned.

In this example, there is no door on the front of the body 102 to close a front opening 104. This front opening 104 acts as the exhaust for the heat and smoke from burning fuel sources. This front opening 104 draws the heat from the back of the oven to the front cooking area 462.

A front ledge 466 is formed below the ceiling 460 of the oven 100 that causes some of the heat from the gas burner 406 and burning wood 492 held by the wood burning tray assembly 420 to reflect downwards and convection/circulate through the oven 100. This heats up the removable baking stone 402 to allow the bottom of the Neapolitan style pizza 490 to cook evenly with the top part of the Neapolitan style pizza 490. Further, smoke from the burning wood 492 is directed along a similar path add the desired smoky flavor to the Neapolitan style pizza 490.

The wood burning tray assembly 420 includes a top grate 510 and an ashtray 520. As noted, the wood burning tray assembly 420 generally holds burning wood 492 positioned within the cooking cavity 482 of the oven 100.

The top grate 510 generally supports wood 492 positioned on the top grate 510 and includes openings 512 to allow air to circulate around for combustion and ash to fall into the ashtray 520. The top grate 510 also includes a lip 514 to generally maintain the wood on the top grate 510.

The ashtray 520 of the wood burning tray assembly 420 includes sides 522 with openings 606 to allow for airflow therethrough for combustion. Pegs 710 are positioned about the sides 522 to engage and hold the top grate 510 in position on top of the ashtray 520, as shown.

The ashtray 520 also includes an opening 524 through which a portion of the gas burner 406 is positioned, as described further herein. The sides 522 and a bottom 610 of the ashtray 520 form an interior space 602 where combustion of the gas by the gas burner 406 occurs. In addition, ash from the burning wood 492 on the top grate 510 falls (e.g., through the openings 512) and is maintained in the ashtray 520 for easier disposal later.

A flame guard 720 is formed as one of the sides 522 of the ashtray 520 facing the cooking area 462. The flame guard 720 is generally solid and forms a substantial barrier between the hot gas burner 406 and the Neapolitan style pizza 490 so that a crust of the Neapolitan style pizza 490 closest to the gas burner 406 does not burn.

The gas burner 406 is generally positioned through an opening 404 at the back of the oven 100. The gas burner 406 includes a main body 412 that controls the gas burner 406. The main body 412 is connected by a hose barb 810 and through a hose 410 to a source of gas, such a propane. A control knob 408 can be rotated to turn on and off the flow of gas to a gas burner tube 432 coupled to the main body 412 of the gas burner 406.

The burner tube 432 is perforated with holes through which the gas (e.g., propane) flows for combustion. In position within the opening 404 of the oven 100, the burner tube 432 extends through the opening 524 of the wood burning tray assembly 420 and into the interior space 620 where combustion occurs to heat the oven 100 and ignite/burn the wood 492 on the grate 510 of the wood burning tray assembly 420.

The oven 100 is generally assembled as follows. The oven 100 is placed outside (or in a structure with proper ventilation) on a level surface. With the baking stone 402 removed, the wood burning tray assembly 420 is inserted through the front opening 104 of the oven 100 and pushed to the back.

The gas burner 406 is then inserted through the opening 404 at the back of the oven 100 so that the burner tube 432 extends through the opening 524 of the wood burning tray assembly 420 and into the interior space 620. The main body 412 of the gas burner 406 can be affixed to the oven 100 in this position using one or more fasteners (e.g., bolts).

The hose 410 is then attached to a source of gas, such as a propane tank. The control knob 408 can be actuated (e.g., pushed in and rotated) to turn on the flow of gas to the burner tube 432 coupled to the main body 412 of the gas burner 406. An automatic igniter 812 can be actuated by holding in the control knob 408 for a specified period (e.g., 5 seconds). Gas flowing through the burner tube 432 is thereby ignited.

The flame from the gas burner 406 will heat up the cooking cavity 482 of the oven 100 to the desired temperature. A short time (e.g., about 5 minutes) before the Neapolitan style pizza 490 is introduced, small pieces of dry wood 492 are added to the top grate 510 through an access hatch 416 in the back of the oven 100. The flame from the gas burner 406, which is positioned adjacent to (e.g., below) the top grate 510 ignites the wood 492. The hatch door 418 can be placed to close the access hatch 416 to allow the heat and smoke to be circulated to the front of the oven 100 as described herein. The user can periodically remove the hatch door 418 using a handle 1810 to add more wood 492, as needed.

The Neapolitan style pizza 490 can thereupon be positioned on the baking stone 402 within the cooking cavity 482 to rapidly cook the pizza in as little as about 90 seconds.

As the wood 492 burns, the ash from the wood 492 falls onto the bottom 610 of the ashtray 520 within the interior space 602. The ash can easily be removed once the oven 100 cools by disconnecting the gas burner 406 and sliding the wood burning tray assembly 420 out of the front opening 104.

The majority of the components of the oven can be made from stainless or similar materials that are assembled to form the oven, including the gas burner and the wood burning tray assembly. The size and/or shape of each component can be modified from that depicted and still function in a similar way.

Referring now to FIGS. 19-31, another example oven 1900 with a body 1902 forming cooking cavity 1982 is shown. The oven 1900 is similar to the oven 100 described above, in that the oven 1900 is fueled by both a gas burner 1906 and wood held by a wood burning tray assembly 1920.

Specifically, heat from the gas burner 1906 heats the oven 1900 and ignites wood on a grate 1910 of the wood burning tray assembly 1920. The grate 1910 includes a surface portion 1912 with openings, upon which the wood sits. The grate 1910 also includes leg portions 1914 that are positioned within an ashtray 1922 of the wood burning tray assembly 1920 to elevate the surface portion 1912 within the ashtray 1922.

The ashtray 1922 of the wood burning tray assembly 1920 also includes an opening 1924 through which a burner tube 2310 of the gas burner 1906 is positioned, similar to the oven 100 above. However, unlike the oven 100 above, the ashtray 1922 of the oven 1900 further includes another opening 1926 opposite the opening 1924 sized to allow a portion 2312 of the burner tube 2310 to extend.

More specifically, the portion 2312 of the burner tube 2310 extends from the opening 1926 of the ashtray 1922 to underneath along a portion 2320 of the removable baking stone 402 (which is approximately 16 inches in length). In the example shown, the portion 2312 of the burner tube 2310 extends a distance 2316 of approximately 8.5 inches along the portion 2320. This is approximately one-half the length of the baking stone 402. In alternative designs, the distance 2316 can be shorter or longer, such as equal to about 1 inch, 16 inches (i.e., full length of the baking stone 402), or any distance therebetween.

In this configuration, the baking stone 402 is elevated from a lower surface 2324 of the oven 1900 a distance 2330 of 1.5 inches to allow the portion 2312 to extend underneath. When the gas burner 1906 is ignited, the portion 2312 of the burner tube 2310 directly heats a lower surface 2322 of the portion 2320 of the removable baking stone 402.

Heating of the baking stone 402 directly by the portion 2320 can allow the baking stone 402 to heat more quickly. Further, the temperature of the baking stone 402 can be controlled more directly by setting a desired temperature based upon the setpoint of the gas burner 1906 (e.g., rotating the control knob 408 to turn on and off the flow of gas to the burner tube 2310). This, in turn, allows for the Neapolitan style pizza (or other food item) positioned on the baking stone 402 to bake more quickly, along with other heat provided by the remainder of the burner tube 2310 and any heat and smoke optionally generated by wood held by a wood burning tray assembly 1920.

The oven 1900 also includes a grate/door 1950 is positioned to cover the gap (distance 2330) between the lower surface 2324 of the oven 1900 and the baking stone 402. The grate/door 1950 includes openings to allow ventilation and air flow to the gas burner 1906 below the stone baking stone 402. The grate/door 1950 also includes handles 1952 that allow the grate/door 1950 to be grasped and pulled out of the oven 1900 to access the gap for cleaning purposes.

In alternative designs, the gas burner tube can be positioned differently. For instance, in other designs, the gas burner tube can be configured to extend further underneath the baking stone to cover a greater portion of the baking stone. In yet other examples, the gas burner tube can be repositioned to heat other portions of the baking stone, such as the upper surface or end surface. In yet other designs, the portion of the burner below the baking stone can be controlled independently from the portion of the burner located within the ashtray. For instance, the size of the flame under the baking stone can be controlled separately from the size of the flame within the ashtray. Other configurations are possible.

Figure 32:
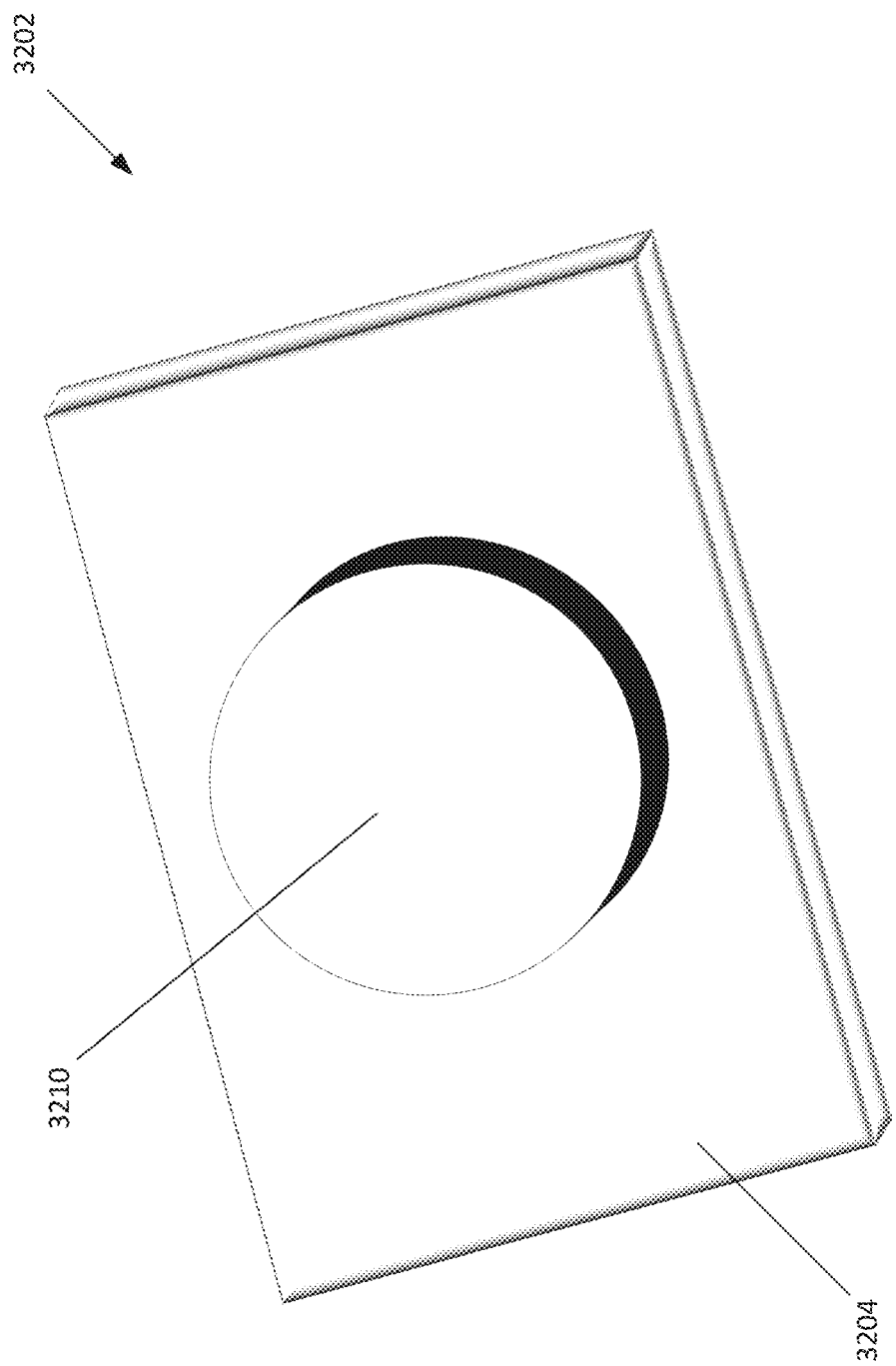
FIG. 32 shows an example of a baking stone with a rotating portion.

Referring now to FIG. 32, another example baking stone 3202 is shown. In this example, the baking stone 3202 includes a rotating portion 3210 that can rotate relative to a main body 3204 of the baking stone 3202. This can be advantageous, for instance, to cook the food item (e.g., pizza) more evenly as the food item sits upon and is rotated by the rotating portion 3210 during cooking in the oven 1900.

The rotating portion 3210 can be made of the same material as the main body 3204 of the baking stone 3202 or another material. The rotating portion 3210 is coupled to the main body 3204 and rotates relative thereto. For instance, lubrication or ball bearings can be used to allow for easier movement of the rotating portion 3210 relative to the main body 3204.

Figure 33:
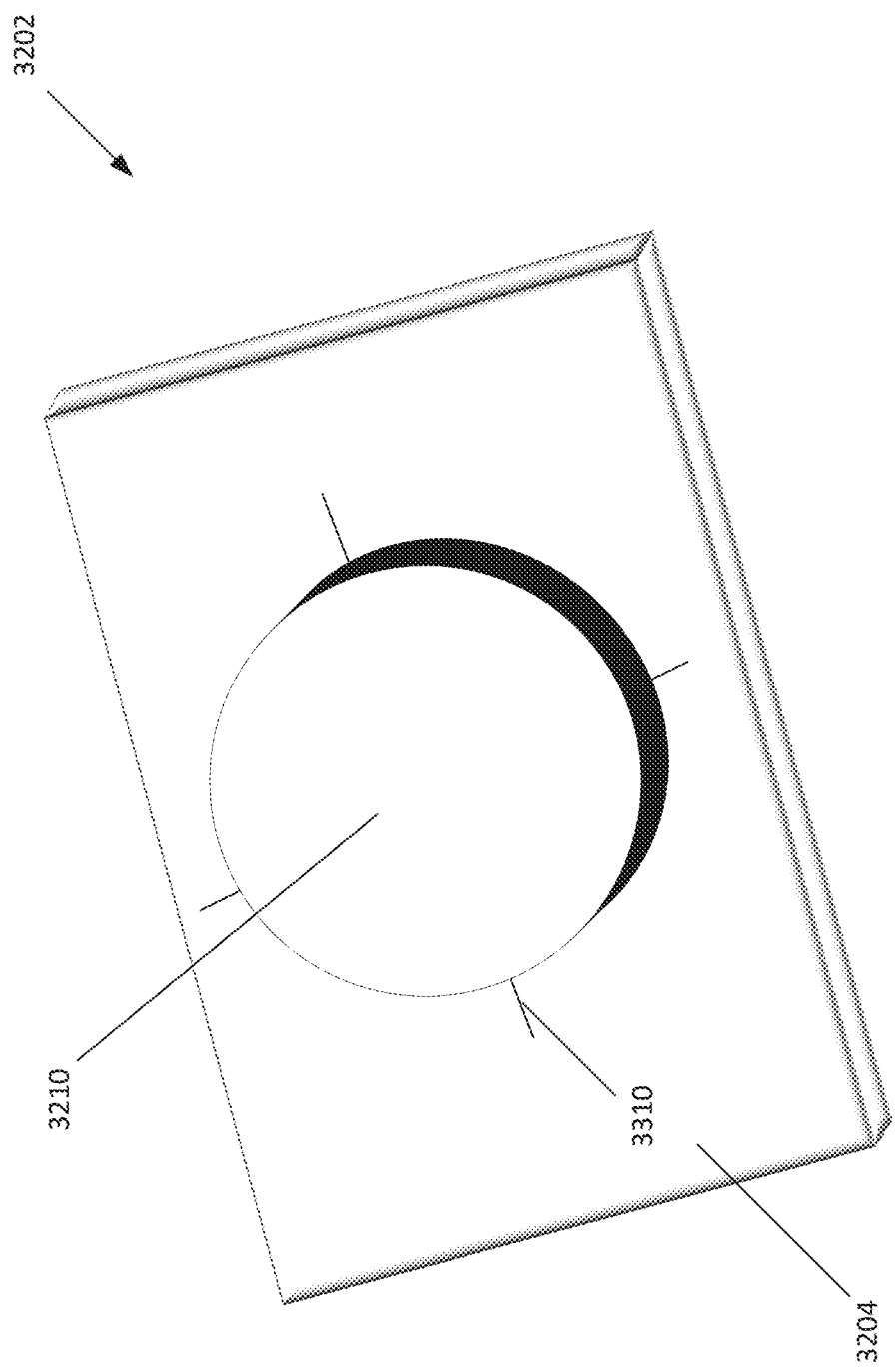
FIG. 33 shows another example of a baking stone with a rotating portion.

In some examples, the rotating portion 3210 can be rotated manually. For instance, as shown in FIG. 33, the example rotating portion 3210 can include extended portions 3310 extending radially outward from the rotating portion 3210 at periodic intervals along the circumferential edge of the rotating portion 3210. This allows the user to easily spin the rotating portion 3210 by engaging one of the extended portions 3310 with, for instance, a spatula or other tool, during cooking. Other configurations (e.g., notches) and/or ways to manually spin the rotating portion 3210 are possible.

In other examples, the rotating portion 3210 can automatically spin. For instance, the rotating portion 3210 can be spring-loaded so that it can be wound before being placed within and heated by the oven 1900. The spring can slowly uncoil and rotate the rotating portion 3210 during cooking. In another example, a thermoelectric generator or other source of electricity (e.g., battery or mains power) can be used to power a small motor that is configured to rotate the rotating portion 3210. Other configurations are possible.

Figure 34:
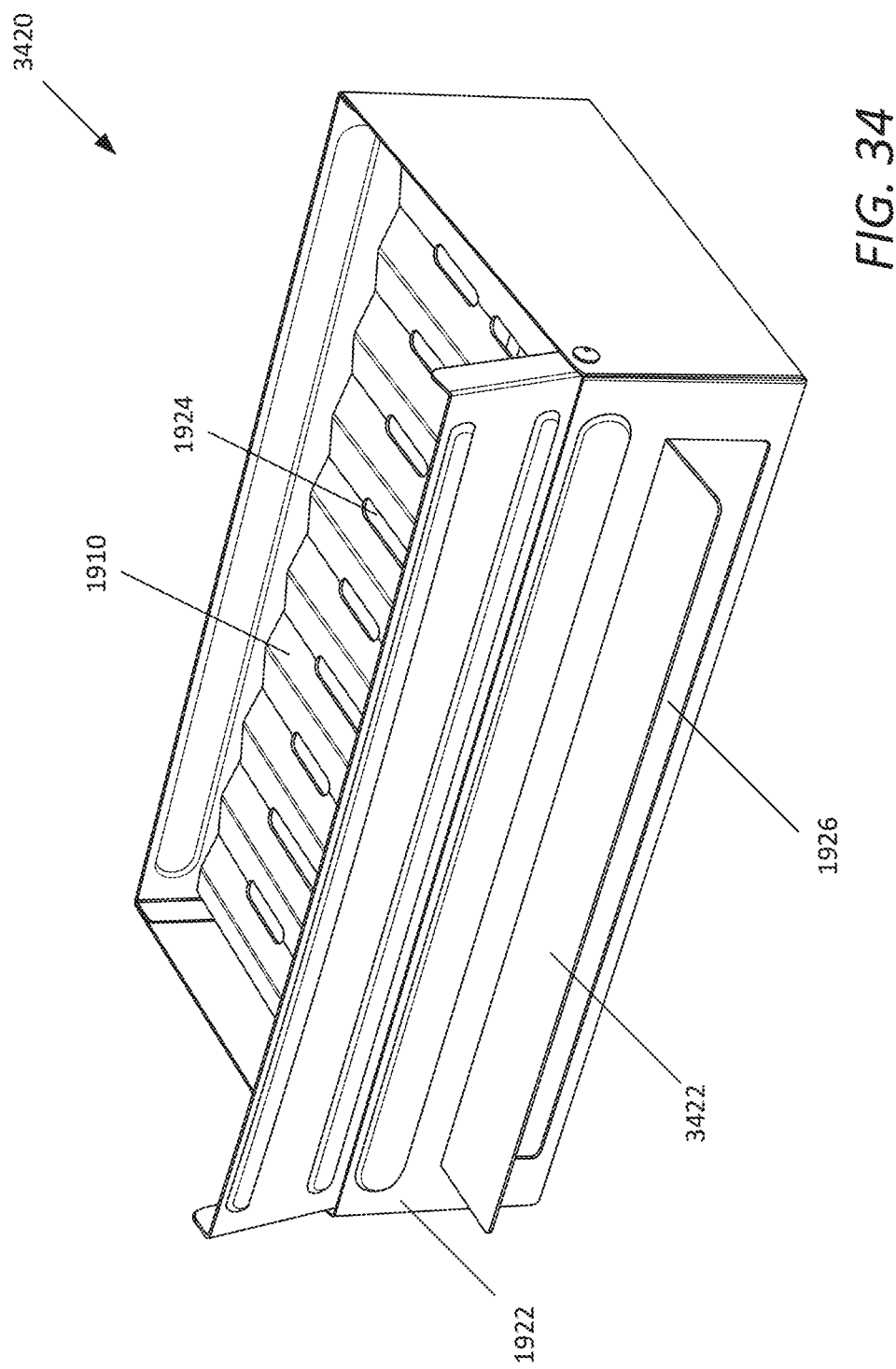
FIG. 34 shows an example wood burning tray assembly of the oven of FIG. 19.

Referring now to FIG. 34, another example wood burning tray assembly 3420 for the oven 1900 is shown. The wood burning tray assembly 3420 is similar to that of the wood burning tray assembly 1920 described above, including the grate 1910 upon which the wood sits, the ashtray 1922, and openings 1924, 1926 through which a burner tube 2310 of the gas burner 1906 extends.

The wood burning tray assembly 3420 also includes a horizontal flange 3422 extending from the ashtray 1922 above the opening 1926 through which the burner tube 2310 extends to underneath along the portion 2320 of the removable baking stone 402.

The flange 3422 covers any gap between the wood burning tray assembly 3420 and the removable baking stone 402. This mitigates any flame from the burner tube 2310 that might extend through that gap and adjacent to a food item on the removable baking stone 402. Specifically, the flange 3422 stops any flame from extending up from that gap and burning the food item. Other configurations are possible.

What is claimed is:
1. An oven, comprising:
    a main body defining a cooking cavity;
    a front portion of the main body defining a front opening for receiving a food item, wherein the food item is a pizza;
    a baking stone positioned to support the food item;
    a tray assembly including a grate positioned in the main body, wherein fuel is placed on the grate adjacent to the baking stone; and
    a gas burner positioned adjacent to the baking stone and the tray assembly;
    wherein the gas burner is configured to combust a gas to heat the cooking cavity;
    wherein the gas burner is positioned to ignite the fuel on the grate of the tray assembly to further heat the cooking cavity;

wherein the gas burner is positioned at least partially under the baking stone to heat an underside of the baking stone;

wherein the baking stone rotates as the pizza is cooked; and wherein the fuel is positioned above the baking stone to cook the pizza.

2. The oven of claim 1, wherein the tray assembly defines an aperture through which a burner tube of the gas burner extends.

3. The oven of claim 2, wherein the burner tube extends adjacent to the fuel on the grate to ignite the fuel.

4. The oven of claim 2, wherein the burner tube extends through the tray assembly, and wherein a portion of the burner tube extends adjacent to the baking stone to heat the baking stone.

5. The oven of claim 4, wherein the portion of the burner tube extends under the baking stone to heat the baking stone.

6. The oven of claim 4, wherein the portion of the burner tube is approximately one-half a length of the baking stone.

7. The oven of claim 1, wherein the grate of the tray assembly is removable.

8. The oven of claim 1, further comprising a rotating portion of the baking stone, wherein the rotating portion is configured to rotate relative to a remainder of the baking stone to rotate the food item as the food item is heated.

9. The oven of claim 8, wherein the rotating portion is configured to rotate manually or automatically.

10. The oven of claim 9, further comprising one or more features positioned at an edge of the rotating portion to allow the rotating portion to be rotated manually.

11. A pizza oven, comprising:
a main body defining a cooking cavity;
a front portion of the main body defining a front opening for receiving a pizza and acting as an air vent;
a baking stone positioned to support the pizza;
a wood burning tray assembly including a grate positioned in the main body; and
a gas burner positioned adjacent to the baking stone and the wood burning tray assembly;
wherein the gas burner is configured to combust a gas to heat the cooking cavity;
wherein the gas burner is positioned to ignite wood on the grate of the wood burning tray assembly to further heat the cooking cavity;
wherein the gas burner is positioned at least partially under the baking stone to heat an underside of the baking stone;
wherein the baking stone rotates as the pizza is cooked; and
wherein the wood is positioned above the baking stone to cook the pizza.

12. The pizza oven of claim 11, wherein the wood burning tray assembly defines an aperture through which a burner tube of the gas burner extends.

13. The pizza oven of claim 12, wherein the burner tube extends adjacent to the wood on the grate to ignite the wood.

14. The pizza oven of claim 12, wherein the burner tube extends through the wood burning tray assembly, and wherein a portion of the burner tube extends adjacent to the baking stone to heat the baking stone.

15. The pizza oven of claim 14, wherein the portion of the burner tube extends under the baking stone to heat the baking stone.

16. The pizza oven of claim 14, wherein the portion of the burner tube is approximately one-half a length of the baking stone.

17. A pizza oven, comprising:
a main body defining a cooking cavity;
a rotating baking support positioned in the cooking cavity to support a pizza;
a first heat source positioned at least partially under the rotating baking support; and
a second heat source including fuel positioned adjacent to the rotating baking support;
wherein the first heat source heats an underside of the rotating baking support to cook the pizza, wherein the rotating baking support is a rotating baking stone, and wherein the rotating baking stone rotates as the pizza is cooked;
wherein the first heat source is positioned to ignite the fuel of the second heat source; and
wherein the second heat source is positioned above the rotating baking stone to cook the pizza.

18. The pizza oven of claim 17, wherein the first heat source is a gas burner, and wherein the second heat source is wood.

\* \* \* \* \*